United States Patent
Nakamura et al.

(10) Patent No.: US 11,995,294 B2
(45) Date of Patent: May 28, 2024

(54) INFORMATION PROCESSING METHOD

(71) Applicant: Panasonic Intellectual Property Management Co., Ltd., Osaka (JP)

(72) Inventors: Shigeo Nakamura, Osaka (JP); Hajime Ozaki, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/791,450

(22) PCT Filed: Feb. 22, 2021

(86) PCT No.: PCT/JP2021/006656
§ 371 (c)(1),
(2) Date: Jul. 7, 2022

(87) PCT Pub. No.: WO2021/172282
PCT Pub. Date: Sep. 2, 2021

(65) Prior Publication Data
US 2023/0280884 A1    Sep. 7, 2023

(30) Foreign Application Priority Data
Feb. 27, 2020    (JP) .................... 2020-032401

(51) Int. Cl.
*G06F 17/00* (2019.01)
*G06F 3/04817* (2022.01)
(Continued)

(52) U.S. Cl.
CPC ........ *G06F 3/0484* (2013.01); *G06F 3/04817* (2013.01); *G06F 3/0482* (2013.01); *H05B 47/19* (2020.01)

(58) Field of Classification Search
CPC .. G06F 3/0484; G06F 3/04817; G06F 3/0482; H05B 47/19; H05B 47/175
(Continued)

(56) References Cited

U.S. PATENT DOCUMENTS 9,832,833 B1 * 11/2017 Pipe-Mazo ............ H05B 47/19
10,383,200 B1 * 8/2019 Romano ............. H04L 12/2807
(Continued)

FOREIGN PATENT DOCUMENTS

JP    2019-036400 A    3/2019

OTHER PUBLICATIONS

Afzalan, Indoor Positioning Based on Visible Light Communication: A performance-based survey of Real-World Prototypes, ACM Computing Surveys, vol. 52, No. 2 (Year: 2019).*
(Continued)

*Primary Examiner* — Stephen S Hong
*Assistant Examiner* — Matthew J Ludwig
(74) *Attorney, Agent, or Firm* — Rimon P.C.

(57) ABSTRACT

An information processing method executed by an information terminal includes: executing a first obtainment process of obtaining identification information of each of a plurality of lighting fixtures installed in a space, in response to a first request transmitted to a first range in the space by radio wave communication; and executing a second obtainment process of obtaining identification information of part of the plurality of lighting fixtures, in response to a second request transmitted to a second range in the space by radio wave communication, the second range being narrower than the first range.

19 Claims, 26 Drawing Sheets

(51) Int. Cl.
  *G06F 3/0482* (2013.01)
  *G06F 3/0484* (2022.01)
  *H05B 47/19* (2020.01)

(58) Field of Classification Search
  USPC .......................................................... 715/771
  See application file for complete search history.

(56) References Cited

U.S. PATENT DOCUMENTS

| | | | | |
|---|---|---|---|---|
| 10,462,884 | B2* | 10/2019 | Jayawardena | H04W 88/08 |
| 10,505,627 | B2* | 12/2019 | Noh | H04W 76/15 |
| 10,739,978 | B2* | 8/2020 | Nakamura | G06F 3/04847 |
| 11,190,926 | B2* | 11/2021 | Brandt | H05B 47/105 |
| 2012/0001738 | A1* | 1/2012 | Hilgers | G08C 23/04 |
| | | | | 340/12.5 |
| 2013/0324153 | A1* | 12/2013 | Miyawaki | G01S 1/7038 |
| | | | | 455/456.1 |
| 2016/0286624 | A1* | 9/2016 | Patel | H05B 47/175 |
| 2017/0026119 | A1* | 1/2017 | Raj | H04B 10/1149 |
| 2017/0097621 | A1* | 4/2017 | Ackmann | G05B 15/02 |
| 2017/0127495 | A1* | 5/2017 | Mohan | H05B 47/11 |
| 2017/0223807 | A1* | 8/2017 | Recker | H02J 7/34 |
| 2019/0045347 | A1* | 2/2019 | Yamamoto | H05B 47/19 |
| 2019/0053355 | A1 | 2/2019 | Yamauchi et al. | |
| 2019/0215936 | A1* | 7/2019 | Hartung | H04W 84/20 |
| 2019/0254147 | A1* | 8/2019 | Murakami | H04B 17/318 |

OTHER PUBLICATIONS

International Search Report issued on Apr. 13, 2021 in International Patent Application No. PCT/JP2021/006656, with English translation.

* cited by examiner

FIG. 4

| Number | Installation position (coordinates) | |
|---|---|---|
| MAC address | X | Y |
| Xxxxxxx0004 | 0.0 | 0.0 |
| Xxxxxxx0009 | 0.0 | 4.0 |
| Xxxxxxx0123 | 8.0 | 0.0 |
| Xxxxxxx0235 | 8.0 | 4.0 |
| ∗ | -3.0 | 5.0 |
| ∗ | -3.0 | 3.0 |
| ∗ | -3.0 | 1.0 |
| ∗ | -3.0 | -1.0 |
| ∗ | ∗ | ∗ |
| ∗ | ∗ | ∗ |
| ∗ | ∗ | ∗ |
| Xxxxxx0042 | 11.0 | 1.0 |
| Xxxxxx0051 | 11.0 | -1.0 |

INFORMATION PROCESSING METHOD

CROSS-REFERENCE OF RELATED APPLICATIONS

This application is the U.S. National Phase under 35 U.S.C. § 371 of International Patent Application No. PCT/JP2021/006656, filed on Feb. 22, 2021, which in turn claims the benefit of Japanese Patent Application No. 2020-032401, filed on Feb. 27, 2020, the entire disclosures of which Applications are incorporated by reference herein.

TECHNICAL FIELD

The present invention relates to an information processing method used, for example, for initial setting of a lighting system.

BACKGROUND ART

Techniques of associating identification information and layout information of lighting fixtures have been proposed. Patent Literature (PTL) 1 discloses a technique of performing such association using an operation device such as a tablet PC or a smartphone.

CITATION LIST

Patent Literature

[PTL 1]
Japanese Unexamined Patent Application Publication No. 2019-36400

SUMMARY OF INVENTION

Technical Problem

When performing association in PTL 1, a user needs to visually confirm the positions of lighting fixtures. The user has difficulty in accurately recognizing the position of a lighting fixture located away from the user. This hinders association with layout information, Hence, a mechanism for distinguishing lighting fixtures located near an operation device from other lighting fixtures is desired.

The present invention provides an information processing method that can present lighting fixtures located near an information terminal to a user.

Solution to Problem

An information processing method according to an aspect of the present invention is an information processing method executed by an information terminal, including: executing a first obtainment process of obtaining identification information of each of a plurality of lighting fixtures installed in a space, in response to a first request transmitted to a first range in the space by radio wave communication; and executing a second obtainment process of obtaining identification information of part of the plurality of lighting fixtures, in response to a second request transmitted to a second range in the space by radio wave communication, the second range being narrower than the first range.

Advantageous Effects of Invention

An information processing method according to the present invention can present lighting fixtures located near an information terminal to a user.

BRIEF DESCRIPTION OF DRAWINGS

FIG. 4 is a diagram illustrating an example of correspondence information.

DESCRIPTION OF EMBODIMENTS

An embodiment will be described in detail below, with reference to the drawings. The embodiment described below shows a general or specific example. The numerical values, shapes, materials, structural elements, the arrangement and connection of the structural elements, steps, the order of steps, etc. shown in the following embodiment are mere examples, and do not limit the scope of the present invention. Among the structural elements in the following embodiment, those not recited in any one of the independent claims are described as optional structural elements.

Each drawing is a schematic and does not necessarily provide precise depiction. The substantially same elements are given the same reference marks throughout the drawings, and repeated description may be omitted or simplified.

EMBODIMENT

[Structure]

Figure 1:
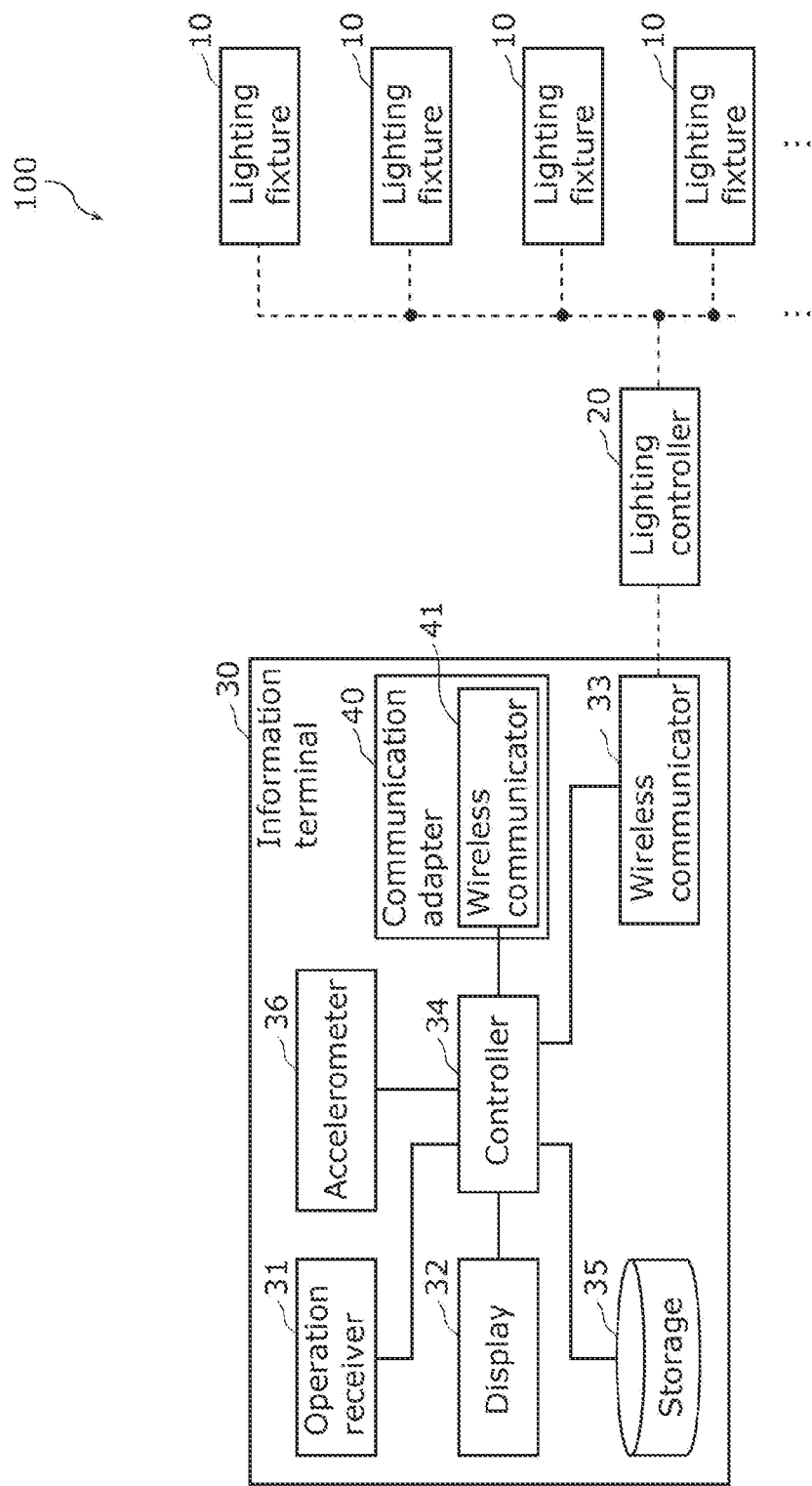
FIG. 1 is a block diagram illustrating the functional structure of a lighting system according to an embodiment.

The structure of a lighting system according to the embodiment will be described below. FIG. 1 is a block diagram illustrating the functional structure of the lighting system according to the embodiment. As illustrated in FIG. 1, lighting system 100 includes a plurality of lighting fixtures 10, lighting controller 20, information terminal 30, and communication adapter 40. Lighting system 100 may include a plurality of lighting controllers 20.

First, lighting fixtures 10 will be described below. Each lighting fixture 10 is a base light or the like that is installed on the ceiling of an indoor space and illuminates the indoor space, and is subjected to light emission control by lighting controller 20. The communication between lighting fixture 10 and lighting controller 20 is, for example, wireless communication, but may be wired communication. The form of lighting fixture 10 is not limited, and may be a ceiling light, a downlight, a spotlight, or the like.

Next, lighting controller 20 will be described below, Lighting controller 20 transmits, based on an operation performed on information terminal 30 by a user, a control command to at least part of the plurality of lighting fixtures 10, to perform light emission control on the at least part of the plurality of lighting fixtures 10, Specifically, lighting controller 20 performs light emission control on at least part of the plurality of lighting fixtures 10 based on a control instruction signal received from information terminal 30.

Herein, light emission control includes lighting (turn on) control, shutoff (turn off) control, dimming control, toning control, and the like. The communication between lighting controller 20 and lighting fixture 10 is, for example, wireless communication (more specifically, radio wave communication), An example of the communication standard for the wireless communication is Wi-Fi®.

Next, the structure of information terminal 30 will be described below, Information terminal 30 receives an operation by the user, and transmits a control command to lighting controller 20 according to the received operation. For example, information terminal 30 is a portable terminal such as a smartphone, a tablet terminal, or a personal digital assistant (PDA). Information terminal 30 may be a dedicated remote control used in lighting system 100. Information terminal 30 includes operation receiver 31, display 32, wireless communicator 33, controller 34, storage 35, and accelerometer 36, Communication adapter 40 is connected to information terminal 30.

Operation receiver 31 receives an operation by the user. Specifically, operation receiver 31 is implemented by a touch panel or the like.

Display 32 is a display device that displays images under control of controller 34. Display 32 is, for example, implemented by a liquid crystal panel or an organic electroluminescent (EL) panel.

Wireless communicator 33 is a wireless communication circuit by which information terminal 30 performs wireless communication (more specifically, radio wave communication) with lighting controller 20. For example, wireless communicator 33 transmits a control instruction signal to lighting controller 20.

Controller 34 causes wireless communicator 33 to transmit the control instruction signal according to the operation of the user received by operation receiver 31. Controller 34 is, for example, implemented by a microcomputer, but may be implemented by a processor or a dedicated circuit.

Storage 35 is a storage device that stores, for example, a control program executed by controller 34. Storage 35 is, for example, implemented by semiconductor memory.

Accelerometer 36 is a sensor for detecting the inclination of information terminal 30 and the movement of information terminal 30. Specifically, accelerometer 36 is a triaxial accelerometer or the like. Herein, accelerometer 36 denotes an accelerometer in a broad sense, and includes, for example, an inclination sensor for measuring inclination based on acceleration.

Communication adapter 40 is a device that is removably connected to information terminal 30 and provides information terminal 30 with a communication function of a limited radio wave coverage. Communication adapter 40 is, for example, connected to a Universal Serial Bus (USB) socket of information terminal 30. Communication adapter 40 includes wireless communicator 41. The communication standard for wireless communication performed by wireless communication unit 41 is, for example, 920 MHz band radio (specified low power radio).

[Initial Setting Operation (Comparative Example)]

Figure 2:
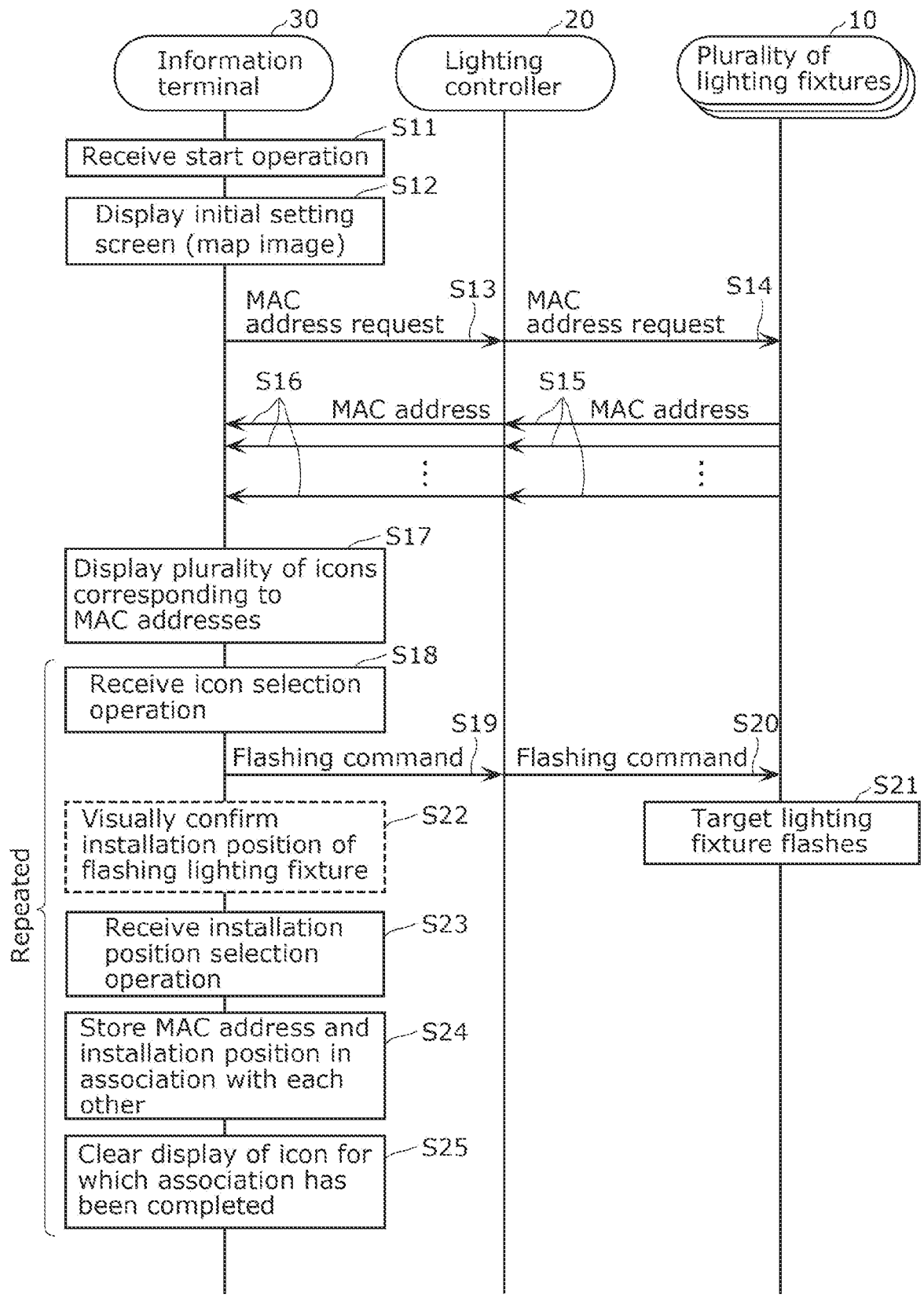
FIG. 2 is a sequence diagram of initial setting operation according to a comparative example.

Initial setting operation according to a comparative example will be described below, FIG. 2 is a sequence diagram of the initial setting operation according to the comparative example. For example, the initial setting operation in FIG. 2 is performed after the plurality of lighting fixtures 10 are installed on the ceiling by installation personnel. The installation personnel is an example of the user.

First, operation receiver 31 in information terminal 30 receives a start operation of instructing information terminal 30 to start the initial setting operation (S11), For example, operation receiver 31 receives the start operation from the installation personnel.

Figure 3:
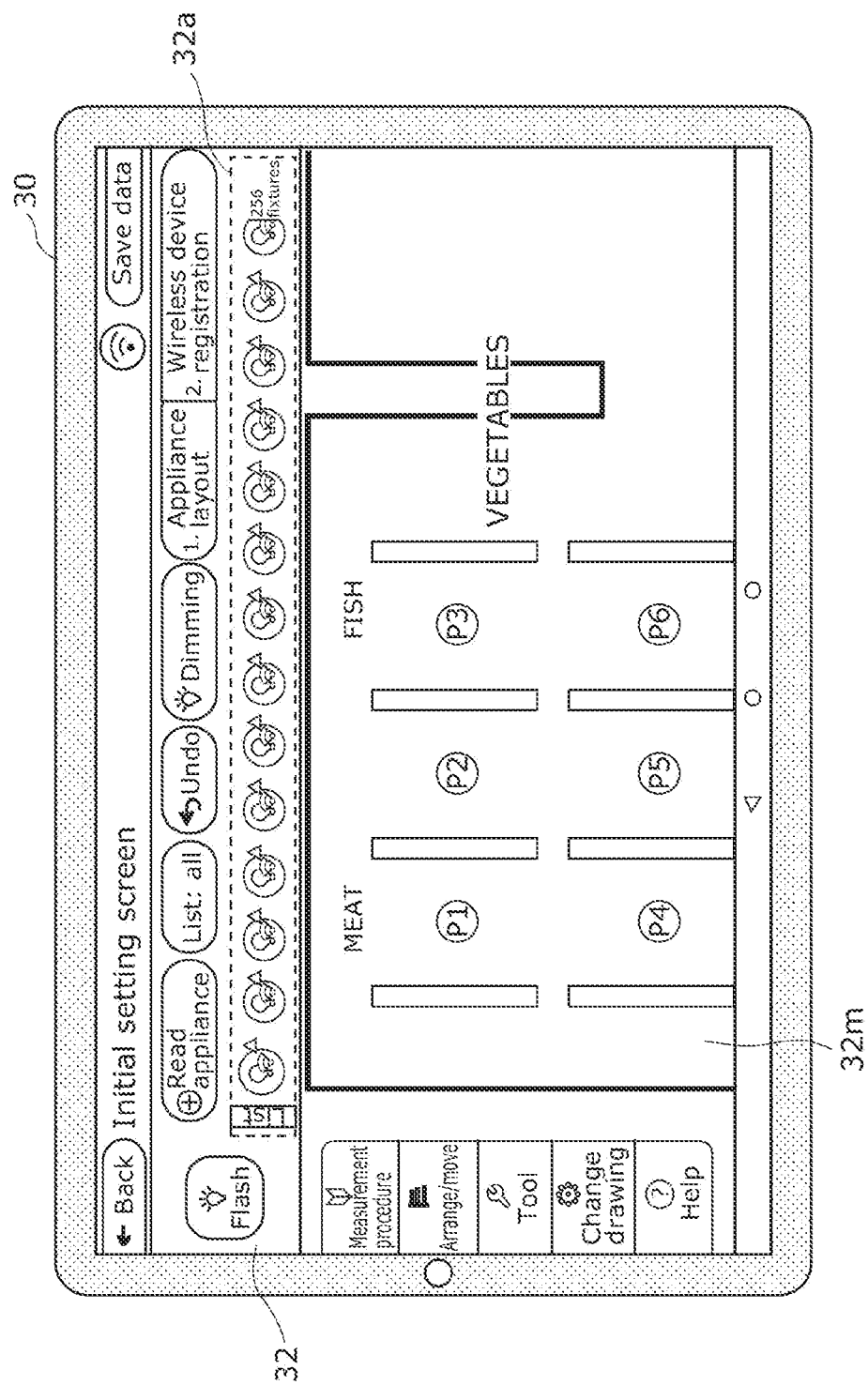
FIG. 3 is a diagram illustrating an example of an initial setting screen according to the comparative example.

Controller 34 displays an initial setting screen including a map image on display 32, based on the start operation received by operation receiver 31 (S12). FIG. 3 is a diagram illustrating an example of the initial setting screen according to the comparative example. Map image 32m is a top view of the area in which the plurality of lighting fixtures 10 are installed. In the example in FIG. 3, installation positions P1 to P6 of the respective lighting fixtures are indicated by circles. That is, map image 32m is an image showing the respective installation positions of the plurality of lighting fixtures 10. A plurality of icons 32a in the initial setting screen in FIG. 3 are actually not displayed in Step S12, and displayed in Step S17 (described later).

Controller 34 causes wireless communicator 33 to transmit a media access control (MAC) address request, based on the start operation received by operation receiver 31 (S13). Lighting controller 20 transmits the MAC address request to the plurality of lighting fixtures 10 by broadcasting (S14).

Each of the plurality of lighting fixtures 10, having received the MAC address request, transmits the MAC address of the lighting fixture in response to the request (S15). The MAC address is relayed by lighting controller 20, and obtained by wireless communicator 33 (S16). The obtained MAC address is stored in storage 35.

After wireless communicator 33 obtains the plurality of MAC addresses, controller 34 displays, on display 32, the plurality of icons 32a corresponding one-to-one to the plurality of MAC addresses in the initial setting screen (S17). The plurality of icons 32a are to be operated by the installation personnel in order to select the plurality of MAC addresses.

Following this, operation receiver 31 receives a selection operation on any of the plurality of icons 32a (S18). For example, the selection operation is a tap operation on any of the plurality of icons 32a. Controller 34 causes wireless communicator 33 to transmit a flashing command, based on the selection operation received by operation receiver 31 (S19), In the flashing command, the MAC address corresponding to selected icon 32a is designated. The flashing command is a signal for selectively flashing lighting fixture 10 having the MAC address out of the plurality of lighting fixtures 10. The flashing command is relayed by lighting controller 20, and received by a corresponding one of the plurality of lighting fixtures 10 (S20).

Lighting fixture 10 having the MAC address designated by the flashing command out of the plurality of lighting fixtures 10 (i.e. lighting fixture 10 subjected to the flashing command) flashes upon receiving the flashing command (S21).

The installation personnel operating information terminal 30 visually confirms the actual installation position of flashing lighting fixture 10 (S22), and selects the installation position (for example, one of installation positions P1 to P6) of flashing lighting fixture 10 on map image 32m. Operation receiver 31 receives the operation of selecting the installation position of lighting fixture 10 in map image 32m, from the installation personnel (S23). Controller 34 then stores the MAC address corresponding to icon 32a selected in Step S18 and the installation position selected in Step S23, in storage 35 in association with each other (S24), Controller 34 also clears the display of icon 32a for which the association has been completed (S25). Consequently, the number of icons 32a displayed in Step S17 decreases by 1.

The process in Steps S18 to S25 is repeatedly performed until all icons 32a (MAC addresses) are associated with installation positions. As a result, correspondence information indicating the correspondence between the MAC addresses of the plurality of lighting fixtures 10 and their installation positions is stored in storage 35. FIG. 4 is a diagram illustrating an example of the correspondence information.

Once the correspondence information has been stored in storage 35 in this way, when an installation position is designated through a map image displayed on information terminal 30, lighting system 100 can perform light emission control on lighting fixture 10 installed at the installation position.

[Initial Setting Operation According to Embodiment]

As mentioned above, the installation personnel visually checks the actual installation position of lighting fixture 10 and the position of lighting fixture 10 in map image 32m against each other in Step S22. In the case where there are hundreds or thousands of lighting fixtures 10 installed in a vast space, if flashing lighting fixture 10 is located away from the installation personnel, the installation personnel may be unable to confirm the accurate installation position of flashing lighting fixture 10.

This problem might be addressed by a structure in which the radio wave coverage when transmitting the MAC address request is narrowed so that only the icons of lighting fixtures 10 located near information terminal 30 will be displayed. With such a structure, however, the total number of the plurality of lighting fixtures 10 installed in the indoor space cannot be identified, and the overall construction quality such as whether all of the plurality of lighting fixtures 10 are appropriately installed (for example, all of the plurality of lighting fixtures 10 are in a wirelessly communicable state) cannot be determined.

Figure 5:
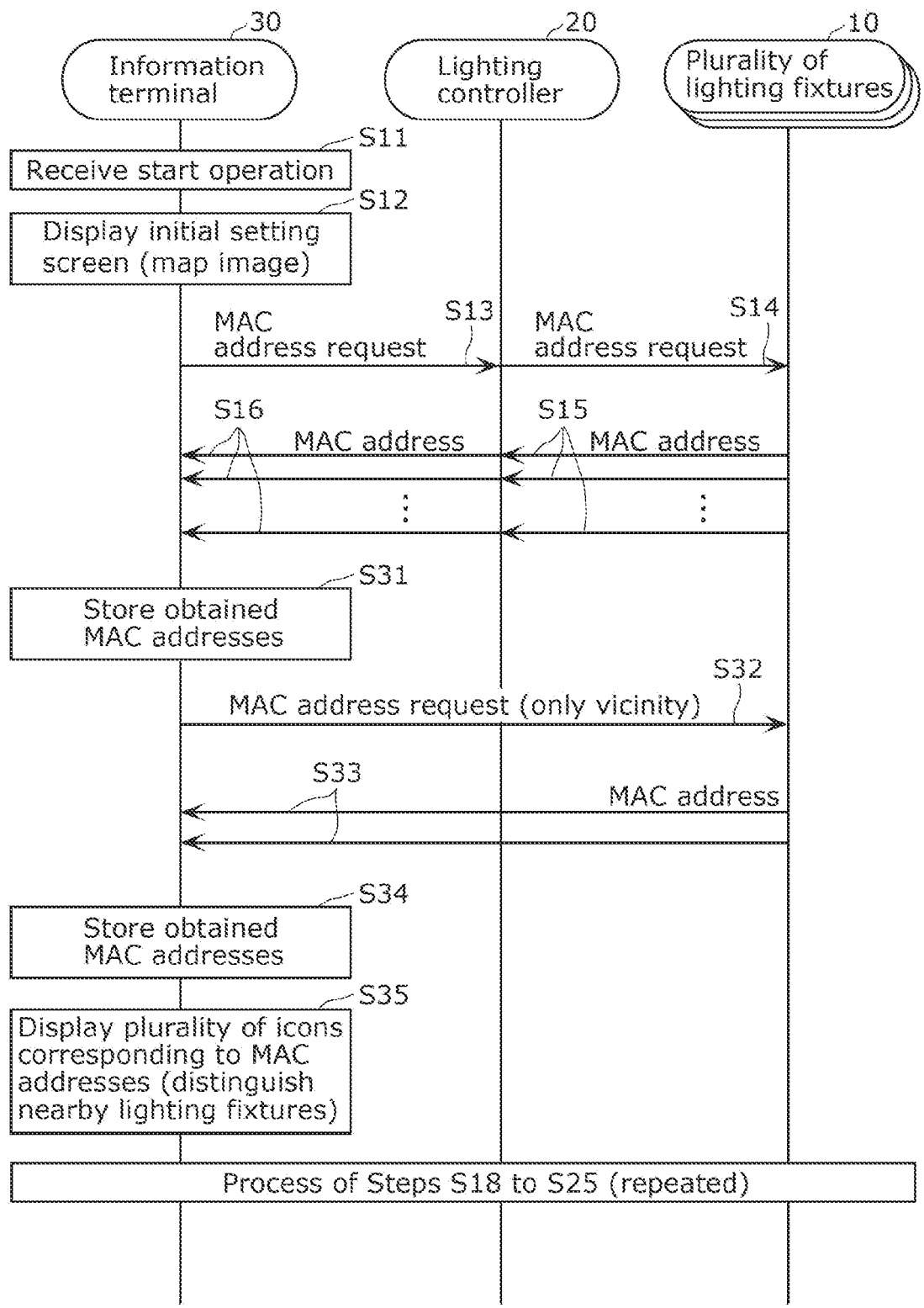
FIG. 5 is a sequence diagram of initial setting operation according to the embodiment.

In view of this, in lighting system 100, while MAC addresses are obtained for all of the plurality of lighting fixtures 10, MAC addresses are also obtained only for lighting fixtures 10 near information terminal 30. FIG. 5 is a sequence diagram of initial setting operation according to this embodiment.

The process in Steps S11 to S16 is as described above. After Step S16, controller 34 stores the MAC addresses obtained by wireless communicator 33 in storage 35 (S31).

Controller 34 then causes wireless communicator 41 in communication adapter 40 connected to information terminal 30, to transmit a MAC address request (S32). Wireless communicator 41 transmits the MAC address request to a plurality of lighting fixtures by broadcasting.

The radio wave coverage of wireless communicator 41 is limited as a result of adjustment of transmission power, antenna directionality, and the like. In Step S14 described above, lighting controller 20 transmits the MAC address request to a first range (for example, substantially the whole indoor space) in the indoor space by radio wave communication. In Step S32, wireless communicator 41 transmits the MAC address request to a second range (for example, only the vicinity of information terminal 30) narrower than the first range in the indoor space by radio wave communication.

Each of the plurality of lighting fixtures 10, having received the MAC address request, transmits the MAC address of the lighting fixture in response to the request. The MAC address is obtained by wireless communicator 33 (S33), and stored in storage 35 (S34).

Based on the plurality of MAC addresses stored in storage 35 in Step S31 and the plurality of MAC addresses stored in storage 35 in Step S34, controller 34 displays a plurality of icons corresponding to the plurality of MAC addresses on display 32 (S35).

Figure 6:
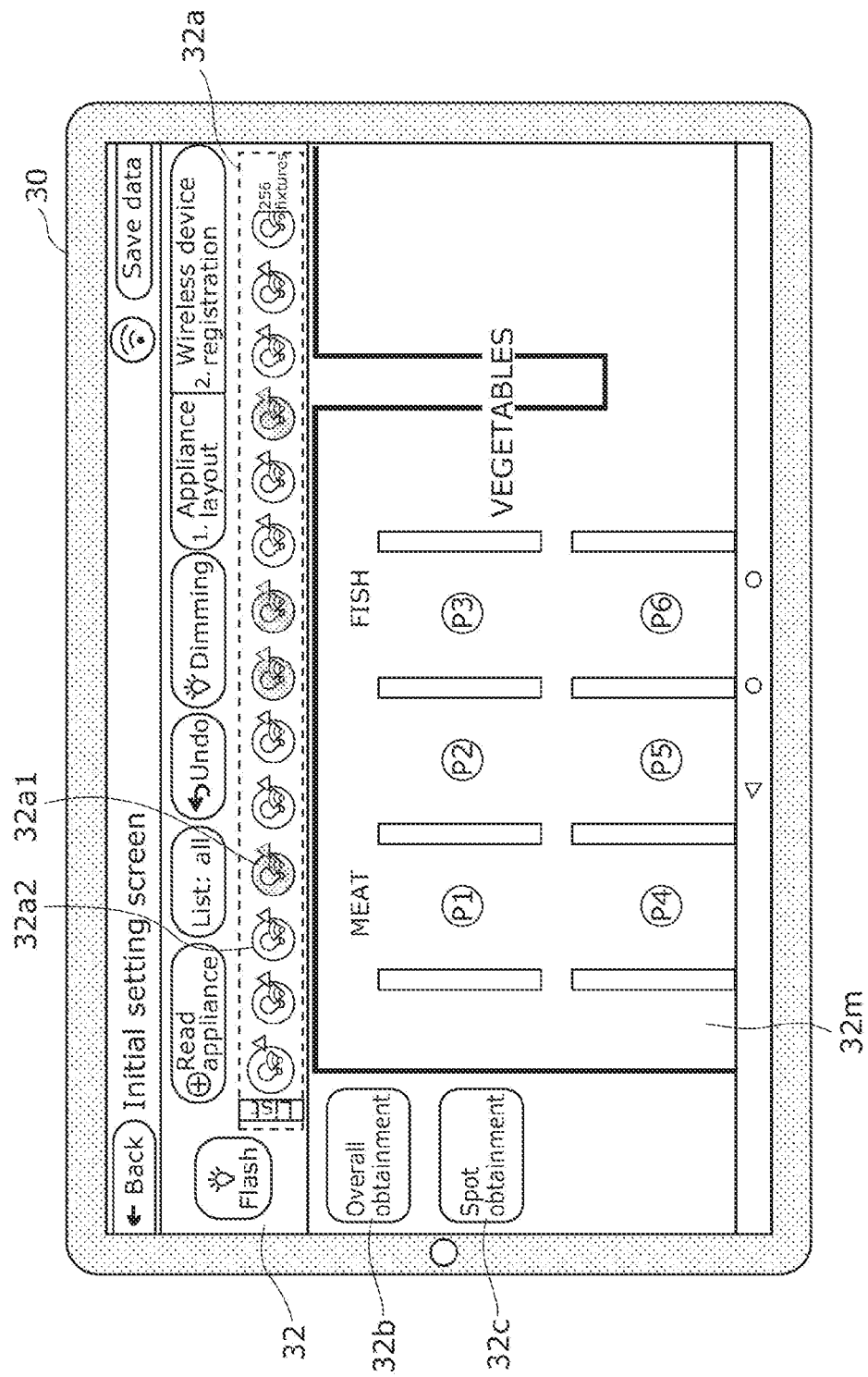
FIG. 6 is a diagram illustrating an example of an initial setting screen according to the embodiment.

In Step S35, a first icon corresponding to each MAC address obtained only in Step S16 out of Steps S16 and S33 and a second icon corresponding to each MAC address obtained in both of Steps S16 and S33 are displayed in different modes. FIG. 6 is a diagram illustrating an example of an initial setting screen according to this embodiment.

First icon 32a1 indicates lighting fixture 10 located far away from information terminal 30, and second icon 32a2 indicates lighting fixture 10 located near information terminal 30. That is, second icon 32a2 is suitable for visual position confirmation by the installation personnel, but first icon 32a1 is not suitable for visual position confirmation by the installation personnel. In the example in FIG. 6, first icon 32a1 is washout-displayed (gray-displayed), and second icon 32a2 is color-displayed.

As a result of the icon of lighting fixture 10 located near information terminal 30 and the icon of lighting fixture 10 located far away from information terminal 30 being displayed in a state of being distinguishable from each other, the installation personnel can select only the icon of lighting fixture 10 located near information terminal and thus suitable for visual position confirmation and associate its MAC address and installation position with each other, Thus, the installation personnel can efficiently perform the association between MAC addresses and installation positions.

Figure 7:
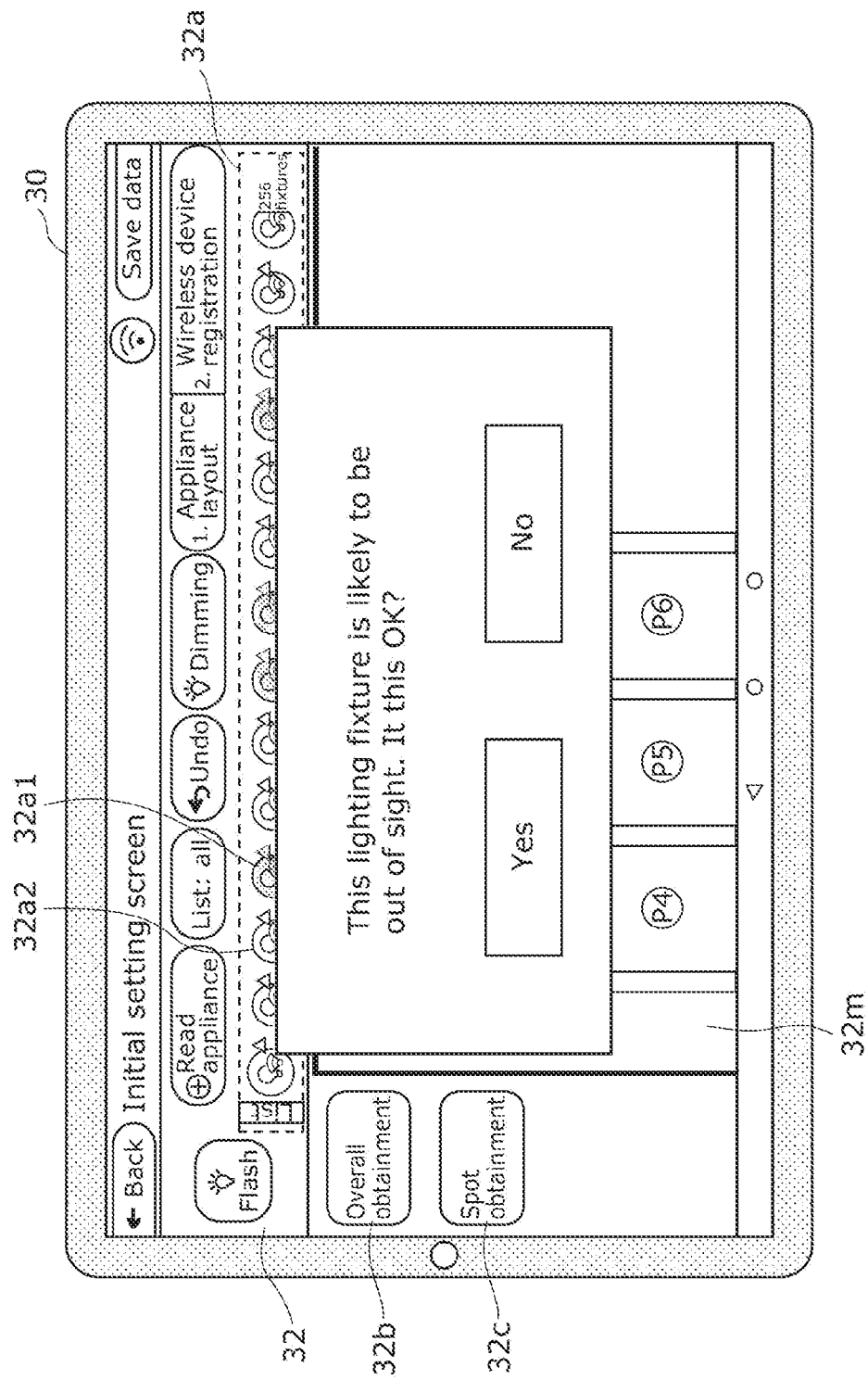
FIG. 7 is a diagram illustrating an example of a notification screen.

A selection operation on first icon 32a1 may be disabled or enabled, A selection operation on first icon 32a1 may be enabled, and, in the case where such selection operation is performed by the installation personnel, a notification screen for notifying the installation personnel that lighting fixture 10 corresponding to first icon 32a1 is located far away (and accordingly there is high possibility that its accurate position cannot be recognized) may be pop-up displayed (superimposed). FIG. 7 is a diagram illustrating an example of such a notification screen. With such a notification screen, the installation personnel can be prevented from accidentally performing a selection operation on first icon 32a1.

First icon 32a1 may not be displayed. In the initial setting screen, at least the total number of the plurality of lighting fixtures (i.e. the number of first icons 32a1, displayed at the right end of the display list of the plurality of icons 32a in FIG. 6) and second icon 32a2 are displayed.

Figure 8:
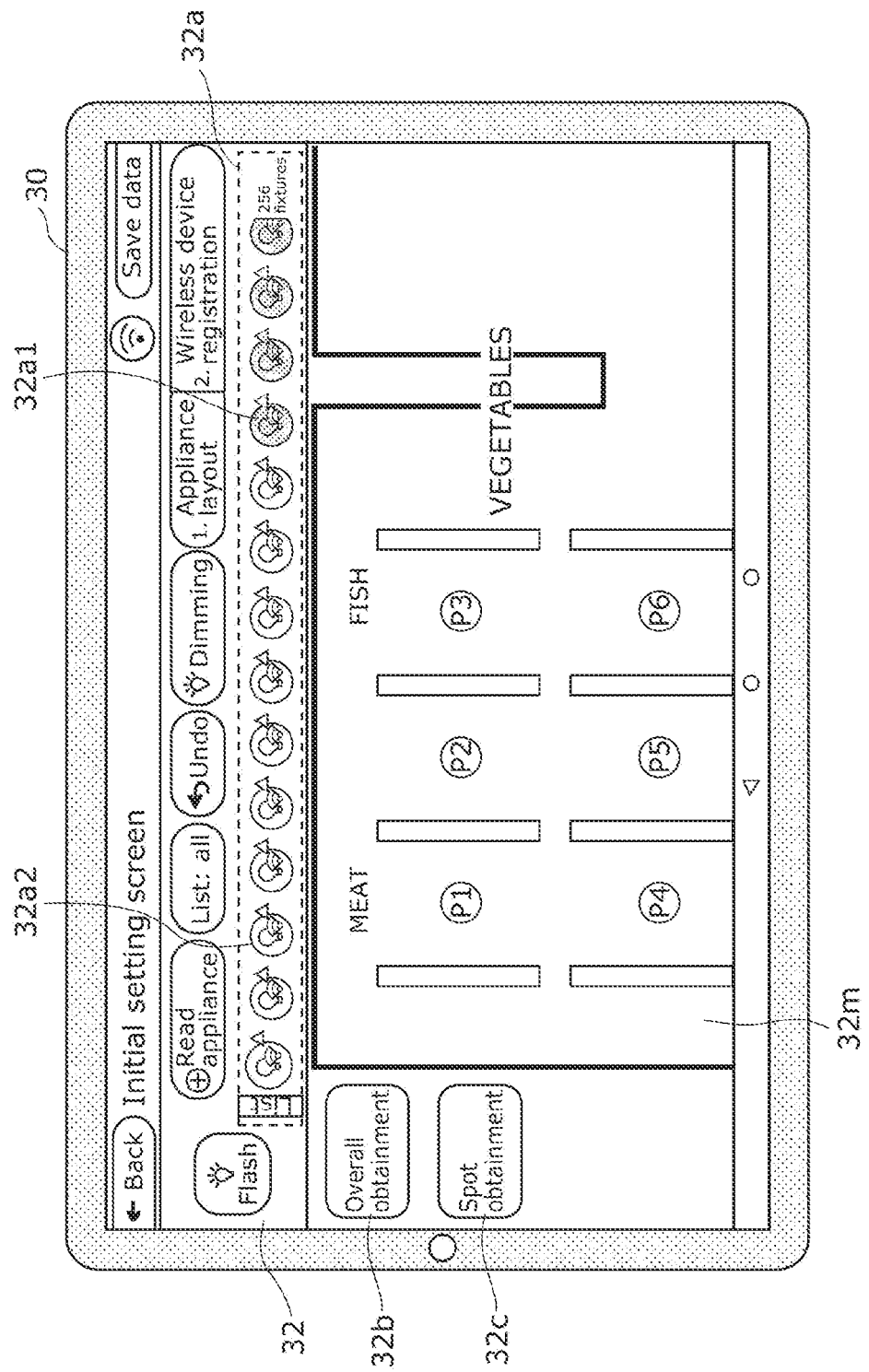
FIG. 8 is a diagram illustrating an example of an initial setting screen in which a plurality of icons are displayed in a sorted state.

Controller 34 may preferentially sort (arrange) and display second icons 32a2 out of the plurality of icons 32a. FIG. 8 is a diagram illustrating an example of an initial setting screen in which the plurality of icons 32a are displayed in a sorted state. In the example in FIG. 8, second icons 32a2 are collected on the left side of display 32, This eases a selection operation on second icon 32a2.

In the case where the MAC address obtainment process in Steps S13 to S16 and S31 (hereafter also referred to as "first obtainment process") is performed again while the plurality of icons 32a are being displayed, the plurality of icons 32a displayed immediately before the first obtainment process is performed again are updated,

[Variations of Icon Display Modes]

First icon 32a1 and second icon 32a2 are not limited as long as they differ in display mode. Variations of the display modes of first icon 32a1 and second icon 32a2 will be described below.

Figure 9:
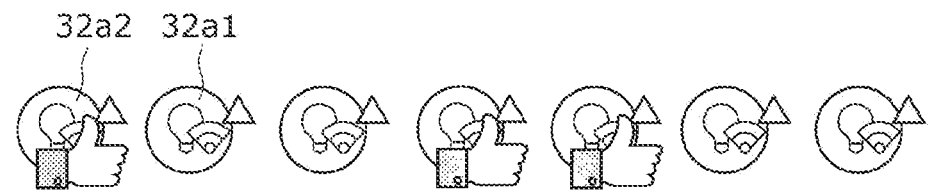
FIG. 9 is a diagram illustrating an example of selectively superimposing a mark only on a second icon out of a first and second icons.

For example, a mark may be superimposed on one of first icon 32a1 and second icon 32a2. FIG. 9 is a diagram illustrating an example of selectively superimposing a mark only on second icon 32a2 out of first icon 32a1 and second icon 32a2. Alternatively, a mark may be selectively superimposed only on first icon 32a1 out of first icon 32a1 and second icon 32a2 (not illustrated).

Figure 10:
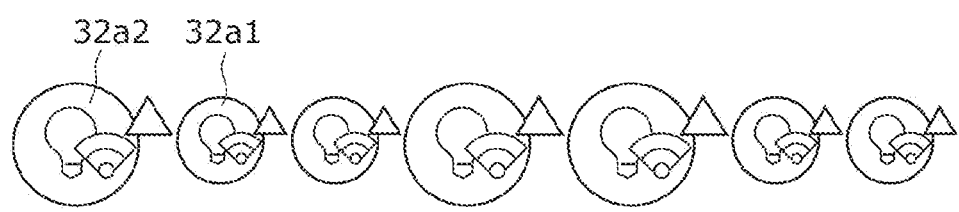
FIG. 10 is a diagram illustrating an example of displaying the second icon in a larger size out of the first and second icons.

For example, first icon 32a1 and second icon 32a2 may differ in size. FIG. 10 is a diagram illustrating an example of displaying second icon 32a2 in a larger size out of first icon 32a1 and second icon 32a2. Alternatively, first icon 32a1 may be displayed in a larger size out of first icon 32a1 and second icon 32a2 (not illustrated).

Figure 11:
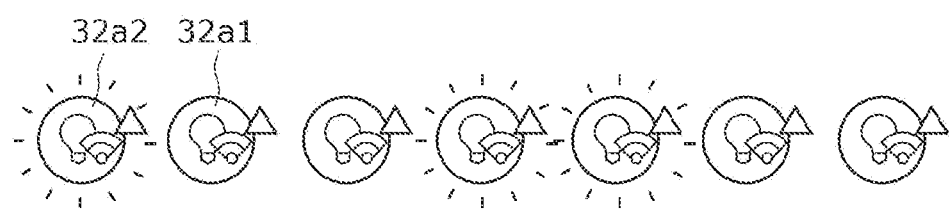
FIG. 11 is a diagram illustrating an example of a flashing only the second icon out of the first and second icons.

For example, one of first icon 32a1 and second icon 32a2 may be flashed. FIG. 11 is a diagram illustrating an example of flashing only second icon 32a2 out of first icon 32a1 and second icon 32a2, Alternatively, only first icon 32a1 may be flashed out of first icon 32a1 and second icon 32a2 (not illustrated). First icon 32a1 and second icon 32a2 may be flashed in different flashing cycles.

Figure 12:
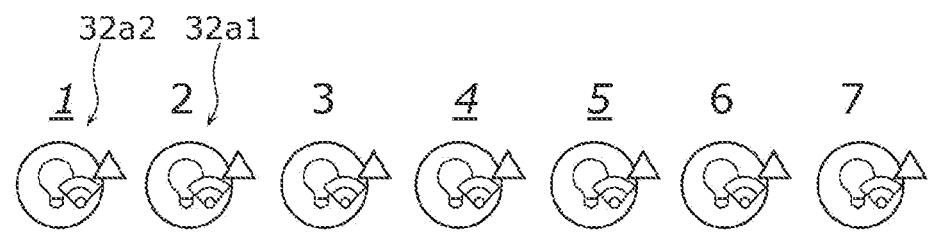
FIG. 12 is a diagram illustrating an example of changing the first and second icons in character display mode.

In the case where first icon 32a1 and second icon 32a2 each include character information, the character display mode (font, character thickness, character color, etc.) may be changed, FIG. 12 is a diagram illustrating an example of changing first icon 32a1 and second icon 32a2 in character display mode.

[Operation Example 1 for Limiting Execution Order of MAC Address Obtainment Processes]

The MAC address obtainment process in Steps S13 to S16 and S31 (hereafter also referred to as "first obtainment process") is executed as a result of first execution icon 32b displayed in the initial setting screen in FIG. 6 being tapped. The MAC address obtainment process in Steps S32 to S34 (hereafter also referred to as "second obtainment process") is executed as a result of second execution icon 32c displayed in the initial setting screen in FIG. 6 being tapped. It is preferable that the installation personnel starts associating the identification information and the installation position of lighting fixture 10 around the installation personnel after recognizing the total number of lighting fixtures 10 included in lighting system 100. In other words, it is preferable that the second obtainment process is performed after the first obtainment process.

Figure 13:
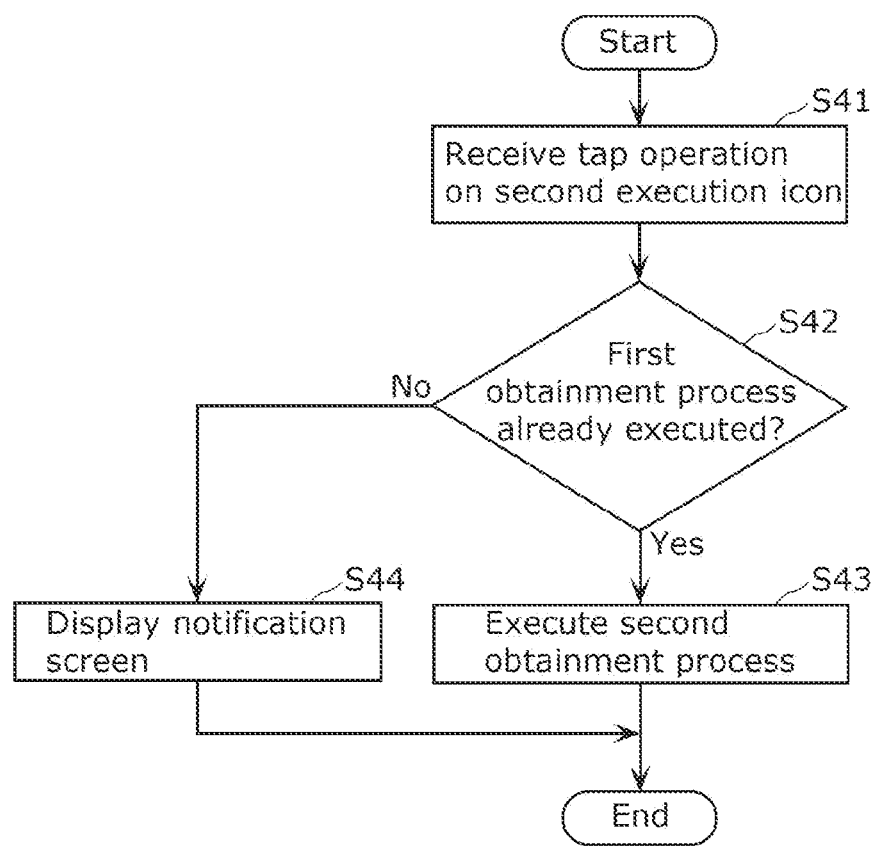
FIG. 13 is a flowchart of Operation Example 1 for limiting the execution order of a first obtainment process and a second obtainment process.

Operation Example 1 for limiting the execution order of the first obtainment process and the second obtainment process will be described below. FIG. 13 is a flowchart of Operation Example 1.

First, operation receiver 31 receives a tap operation on second execution icon 32c (i.e. an operation of instructing information terminal 30 to execute the second obtainment process) (541). After operation receiver 31 receives the tap operation on second execution icon 32c, controller 34 determines whether the first obtainment process has already been executed (S42).

Figure 14:
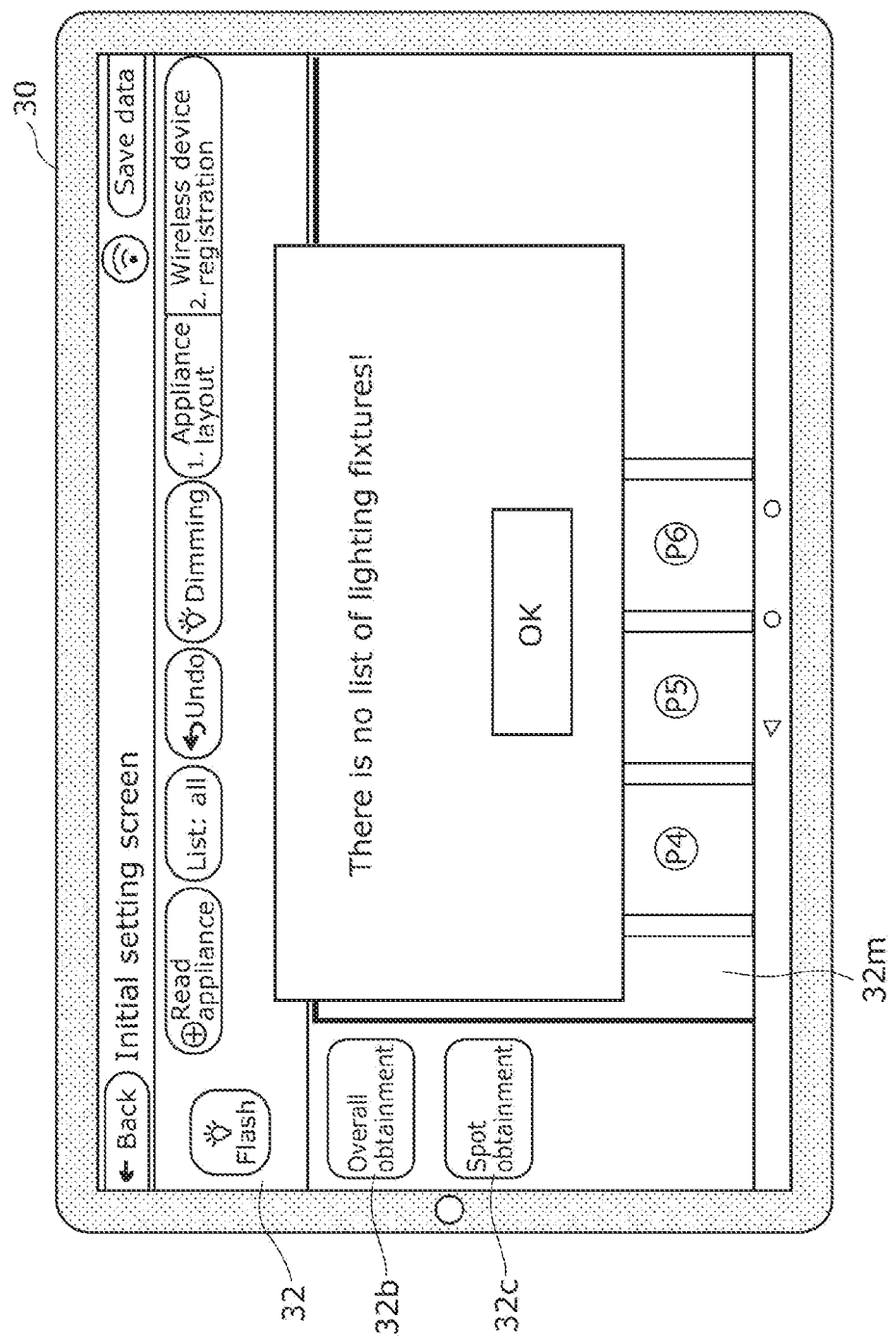
FIG. 14 is a diagram illustrating a first example of a notification screen for notifying that the first obtainment process has not been executed.
Figure 15:
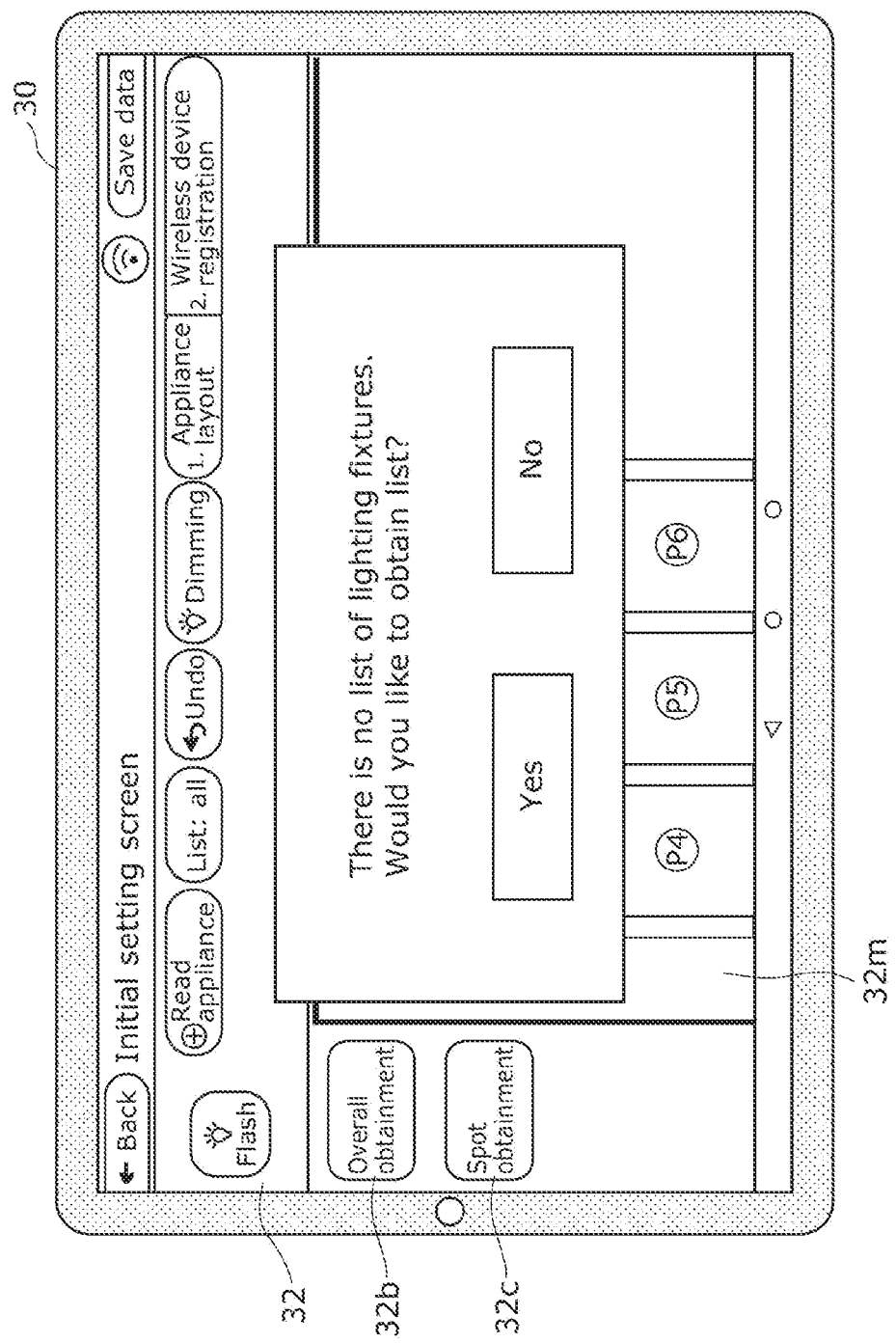
FIG. 15 is a diagram illustrating a second example of a notification screen for notifying that the first obtainment process has not been executed.

In the case where controller 34 determines that the first obtainment process has already been executed (S42: Yes), controller 34 executes the second obtainment process (S43). In the case where controller 34 determines that the first obtainment process has not been executed, controller 34 displays, on display 32, a notification screen for notifying the installation personnel that the first obtainment process has not been executed (S44), without executing the second obtainment process. The notification screen is, for example, pop-up displayed (superimposed) on the initial setting screen. FIG. 14 is a diagram illustrating a first example of the notification screen for notifying that the first obtainment process has not been executed, FIG. 15 is a diagram illustrating a second example of the notification screen for notifying that the first obtainment process has not been executed. In the example in FIG. 14, the installation personnel needs to operate first execution icon 32b in order to execute the first obtainment process. In the example in FIG. 15, on the other hand, the first obtainment process starts as a result of the installation personnel tapping "Yes" icon included in the notification screen.

Thus, in the case where an operation of instructing information terminal 30 to execute the second obtainment process is received from the user before the first obtainment process is executed, information terminal 30 displays, on display 32, the notification screen for notifying that the first obtainment process has not been executed. In this way, information terminal 30 can guide the installation personnel so that the first obtainment process will be executed before the second obtainment process.

[Operation Example 2 for Limiting Execution Order of MAC Address Obtainment Processes]

Figure 16:
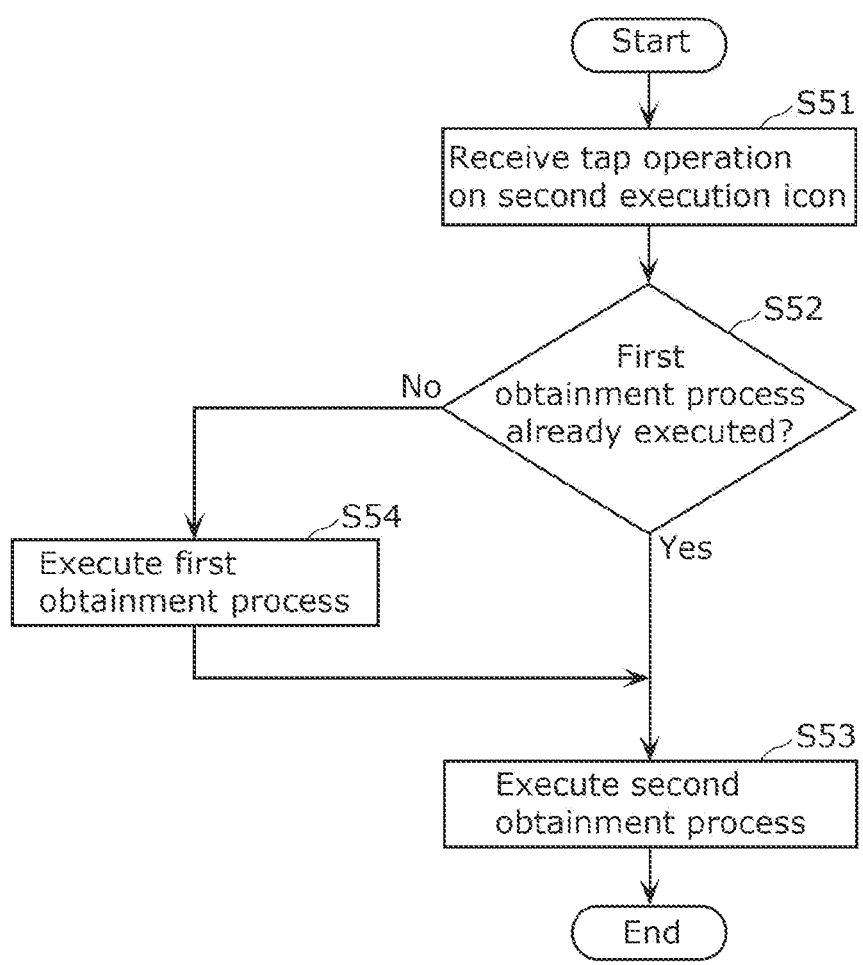
FIG. 16 is a flowchart of Operation Example 2 for limiting the execution order of the first obtainment process and the second obtainment process.

Operation Example 2 for limiting the execution order of the first obtainment process and the second obtainment process will be described below, FIG. 16 is a flowchart of Operation Example 2.

First, operation receiver 31 receives a tap operation on second execution icon 32c (i.e. an operation of instructing information terminal 30 to execute the second obtainment process) (S51). After operation receiver 31 receives the tap operation on second execution icon 32c, controller 34 determines whether the first obtainment process has already been executed (S52).

In the case where controller 34 determines that the first obtainment process has already been executed (S52: Yes), controller 34 executes the second obtainment process (S53). In the case where controller 34 determines that the first obtainment process has not been executed, controller 34 executes the first obtainment process (S54), and then executes the second obtainment process (S53).

Thus, in the case where an operation of instructing information terminal 30 to execute the second obtainment process is received by operation receiver 31 before the first obtainment process is executed, information terminal 30 executes the first obtainment process and then executes the second obtainment process. That is, the first obtainment process is automatically executed. In this way, information terminal 30 can guide the installation personnel so that the first obtainment process will be executed before the second obtainment process.

[Operation Example 3 for Limiting Execution Order of MAC Address Obtainment Processes]

Figure 17:
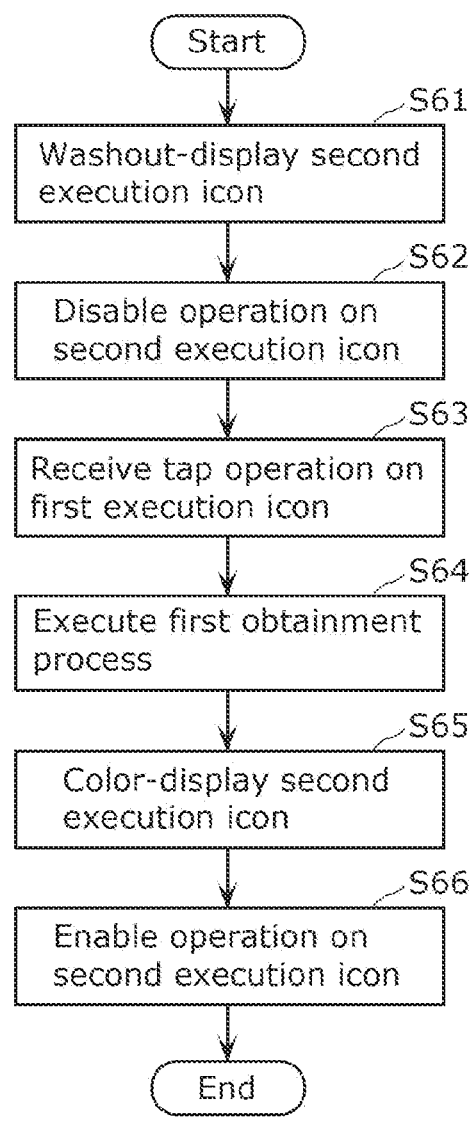
FIG. 17 is a flowchart of Operation Example 3 for limiting the execution order of the first obtainment process and the second obtainment process.

Operation Example 3 for limiting the execution order of the first obtainment process and the second obtainment process will be described below. FIG. 17 is a flowchart of Operation Example 3.

Figure 18:
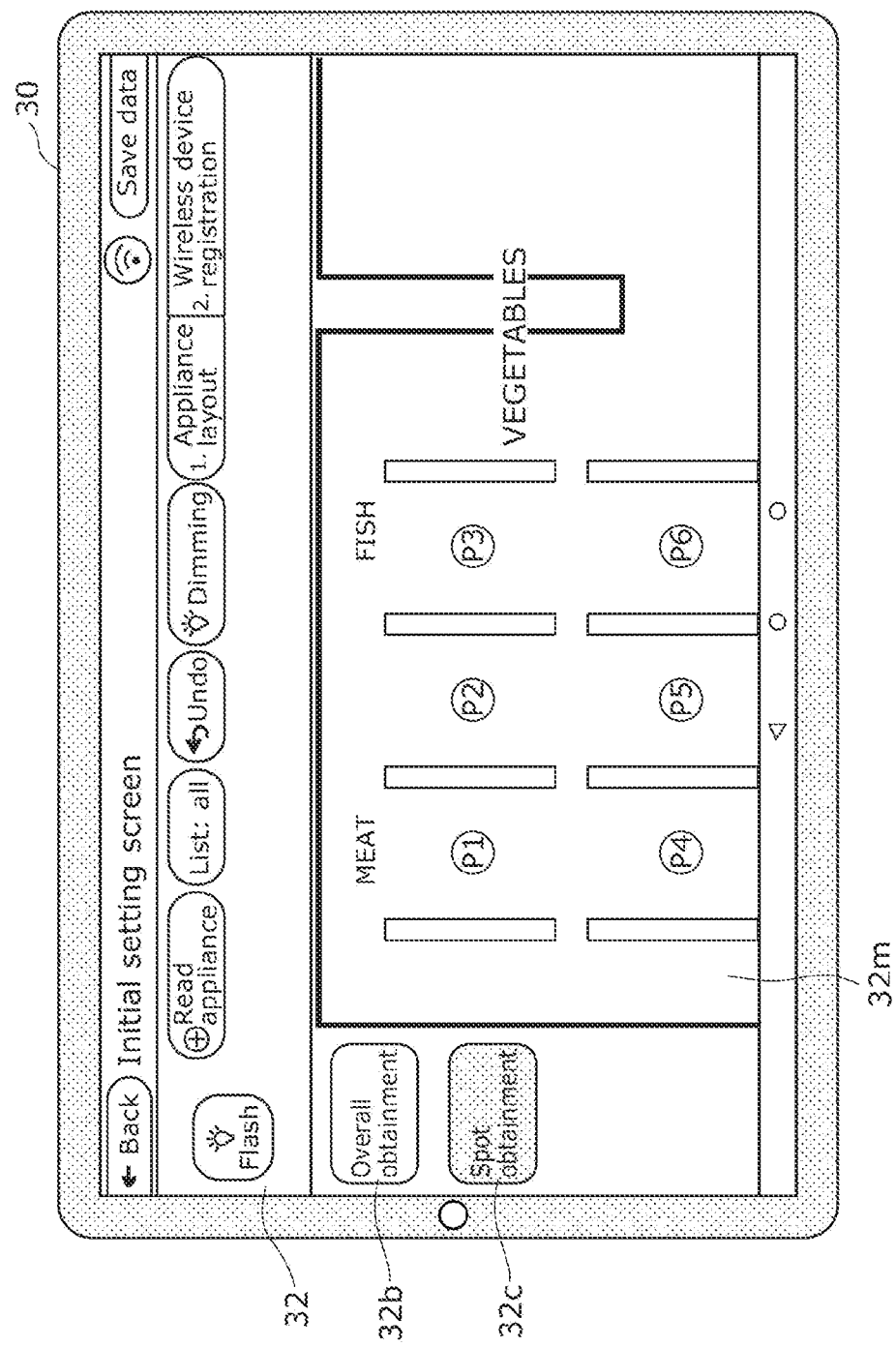
FIG. 18 is a diagram illustrating an example of an initial setting screen in a state in which a second execution icon is disabled.

In Operation Example 3, until the first obtainment process is executed, second execution icon 32c is washout-displayed (gray-displayed) (S61) and the operation on second execution icon 32c is disabled (S62). FIG. 18 is a diagram illustrating an example of an initial setting screen in such a state.

In this state, operation receiver 31 receives a tap operation on first execution icon 32b (i.e. an operation of instructing information terminal 30 to execute the second obtainment process) (S63). After operation receiver 31 receives the tap operation on first execution icon 32b, controller 34 executes the first obtainment process (S64), and changes second execution icon 32c from washout display to color display (S65). Controller 34 subsequently treats the operation on second execution icon 32c as enabled (S66).

Thus, information terminal 30 treats the operation on second execution icon 32c as disabled before the first obtainment process is executed. In this way, information terminal 30 can execute the first obtainment process before the second obtainment process.

[Operation Example 4 for Limiting Execution Order of MAC Address Obtainment Processes]

Figure 19:
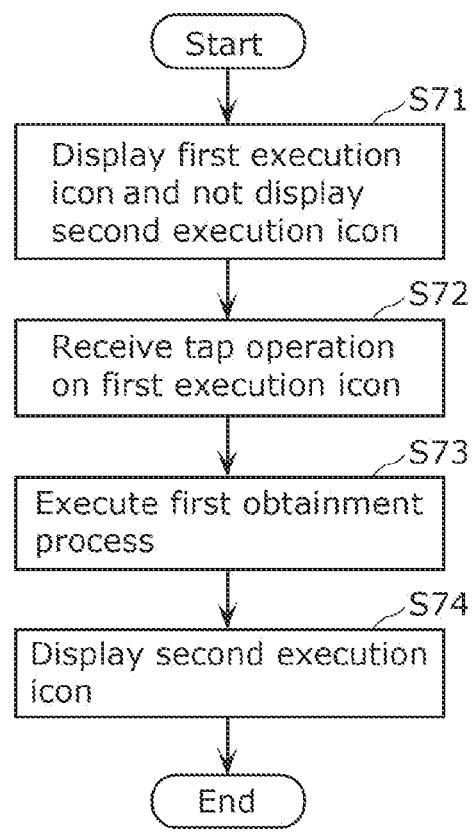
FIG. 19 is a flowchart of Operation Example 4 for limiting the execution order of the first obtainment process and the second obtainment process.

Operation Example 4 for limiting the execution order of the first obtainment process and the second obtainment process will be described below. FIG. 19 is a flowchart of Operation Example 4.

Figure 20:
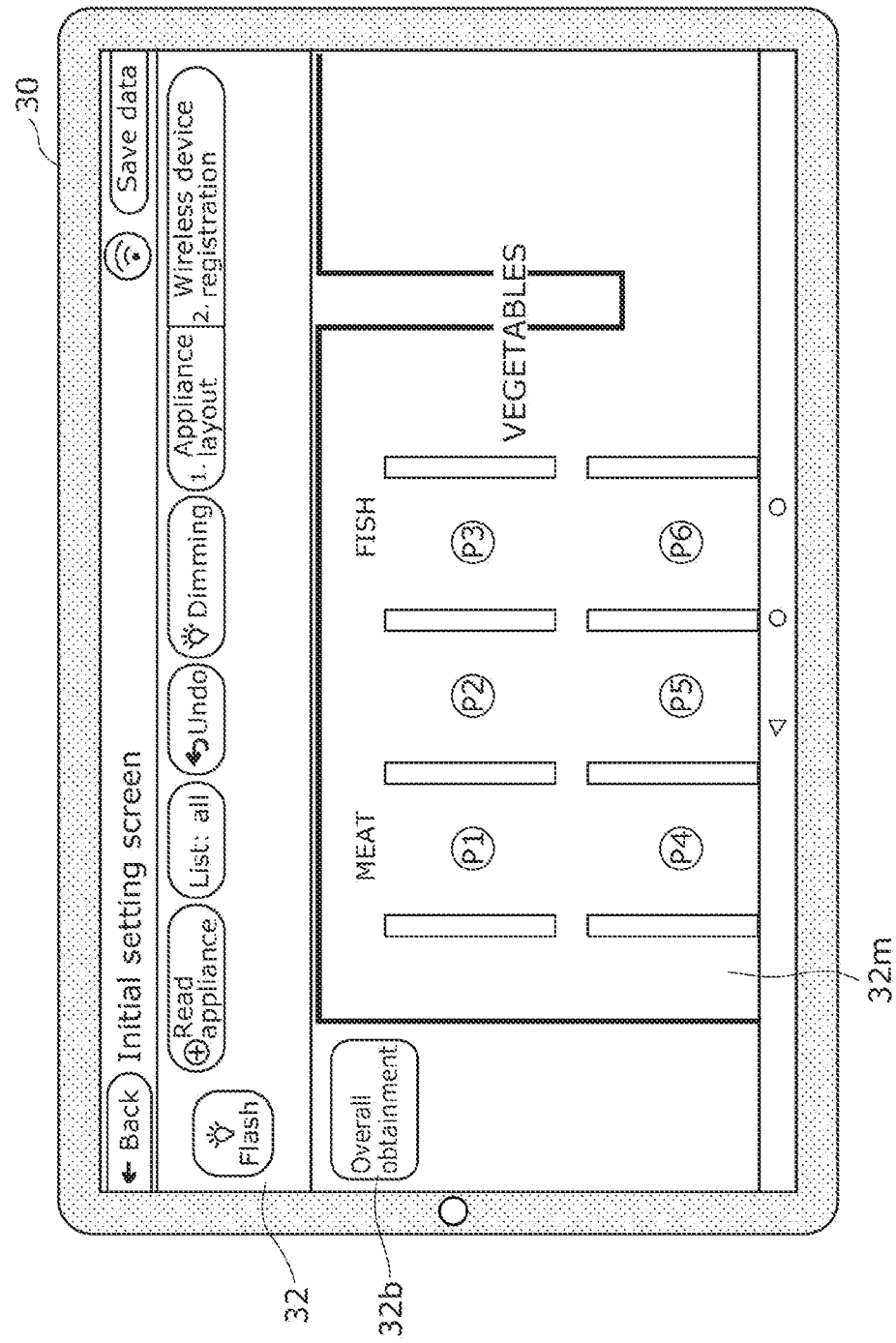
FIG. 20 is a diagram illustrating an example of an initial setting screen in a state in which the second execution icon is not displayed.
Figure 21:
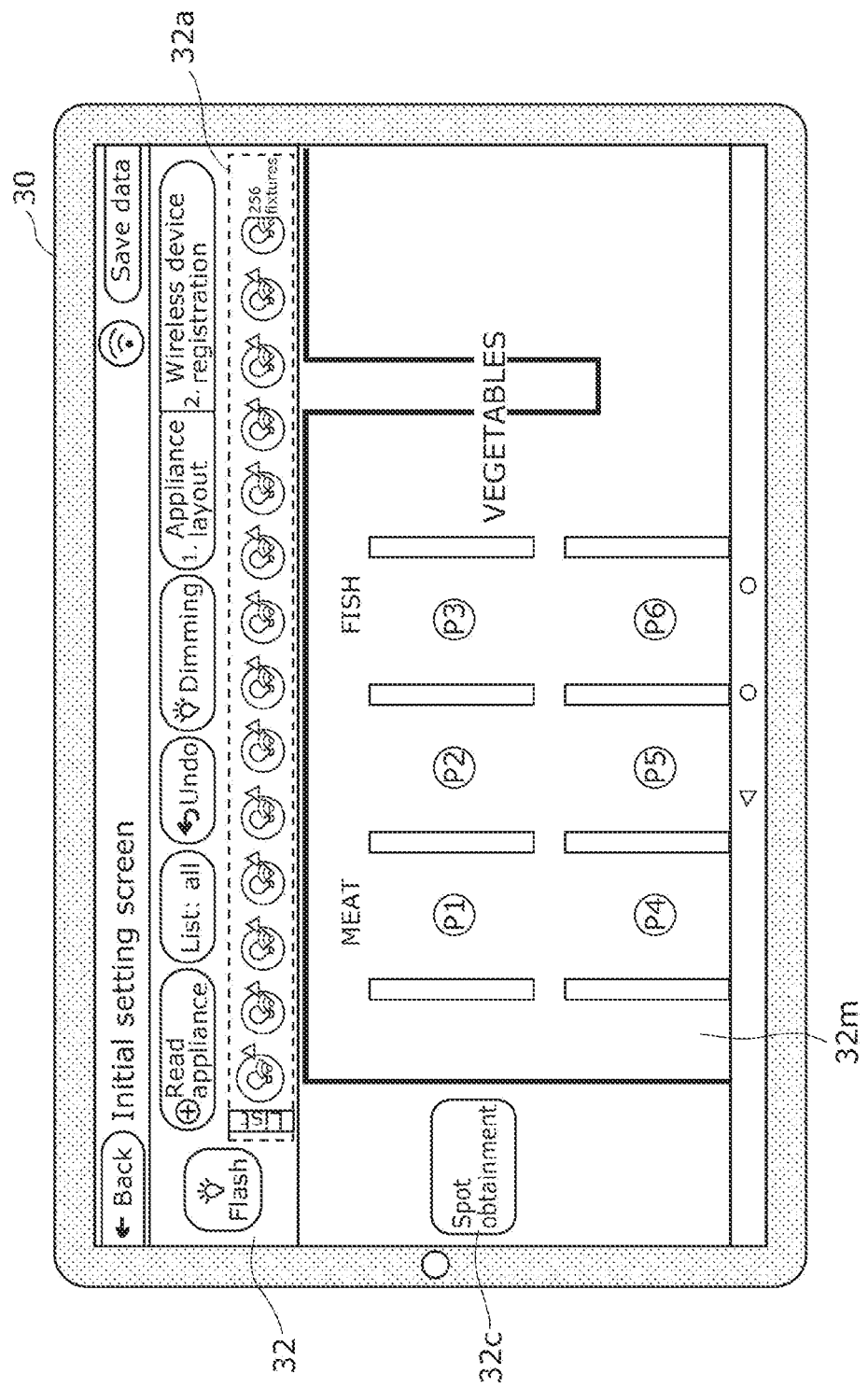
FIG. 21 is a diagram illustrating an example of an initial setting screen in which the second execution icon is displayed.

In Operation Example 4, until the first obtainment process is executed, first execution icon 32b is displayed but second execution icon 32c is not displayed (S71). FIG. 20 is a diagram illustrating an example of an initial setting screen in such a state, In this state, operation receiver 31 receives a tap operation on first execution icon 32b (i.e. an operation of instructing information terminal 30 to execute the second obtainment process) (S72). After operation receiver 31 receives the tap operation on first execution icon 32b, controller 34 executes the first obtainment process (S73), and displays second execution icon 32c (S74). FIG. 21 is a diagram illustrating an example of an initial setting screen in which second execution icon 32c is displayed. Although second execution icon 32c is displayed instead of first execution icon 32b in the example in FIG. 21, second execution icon 32c may be displayed in addition to first execution icon 32b.

Thus, information terminal 30 displays, on display 32, second execution icon 32c to be operated by the installation personnel in order to instruct information terminal 30 to execute the second obtainment process, after the first obtainment process is executed. In this way, information terminal 30 can execute the first obtainment process before the second obtainment process.

[Operation Example 5 for Limiting Execution Order of MAC Address Obtainment Processes]

Figure 22:
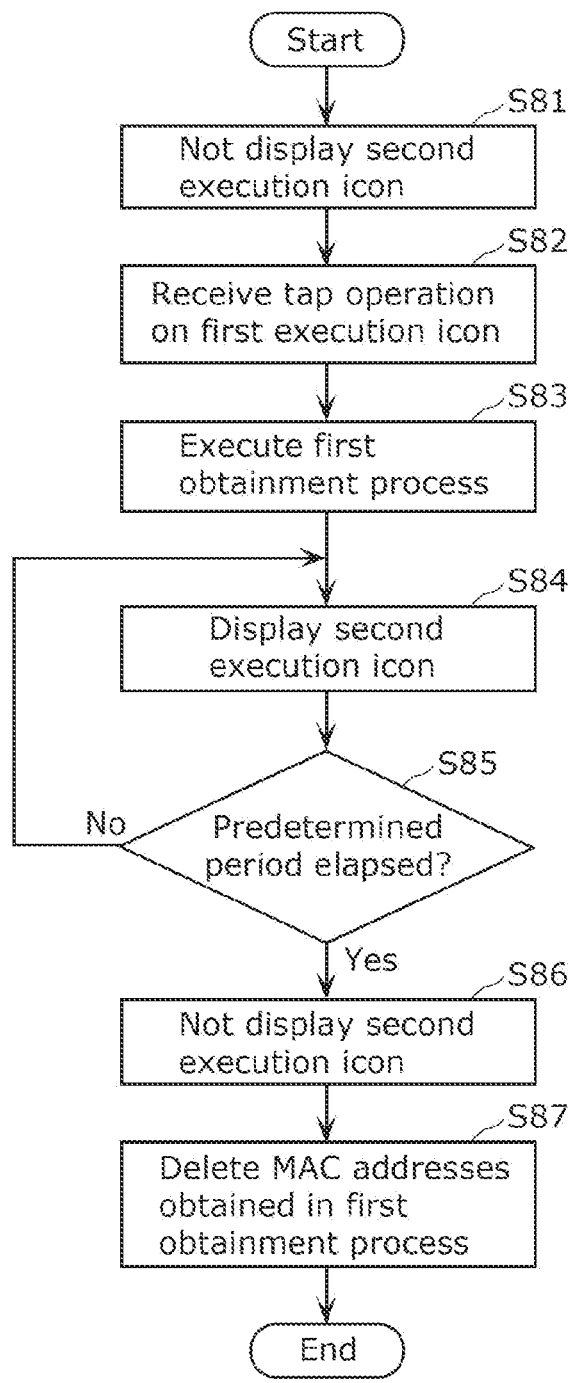
FIG. 22 is a flowchart of Operation Example 5 for limiting the execution order of the first obtainment process and the second obtainment process.

Operation Example 5 for limiting the execution order of the first obtainment process and the second obtainment process will be described below. FIG. 22 is a flowchart of Operation Example 5.

Operation Example 5 further limits the period during which second execution icon 32c is displayed in Operation Example 4.

In a state in which second execution icon 32c is not displayed as illustrated in FIG. 20 (S81), operation receiver 31 receives a tap operation on first execution icon 32b (i.e. an operation of instructing information terminal 30 to execute the second obtainment process) (S82). After operation receiver 31 receives the tap operation on first execution icon 32b, controller 34 executes the first obtainment process (S83), and displays second execution icon 32c (S84).

Controller 34 then determines whether a predetermined period has elapsed from the execution of the first obtainment process (i.e. from the display of second execution icon 32c) (S85). Until the predetermined period elapses from the execution of the first obtainment process (i.e. from the display of the second execution icon) (S85: No), controller 34 continues the display of second execution icon 32c (S84). In the case where controller 34 determines that the predetermined period has elapsed from the execution of the first obtainment process (i.e. from the display of the second execution icon) (S85: Yes), controller 34 clears the display of second execution icon 32c (S86), and deletes the MAC addresses obtained in the first obtainment process in Step S83 and stored in storage 35 (S87). That is, the installation personnel restarts from the first obtainment process.

Thus, information terminal 30 displays second execution icon 32c on display 32 for the predetermined period after the execution of the first obtainment process, and dears the display of second execution icon 32c after the predetermined period elapses. Information terminal 30 also deletes the MAC addresses obtained in the first obtainment process and stored in storage 35. In this way, information terminal 30 can perform the first obtainment process, and perform the second obtainment process within the predetermined period,

[Variation 1]

Figure 23:
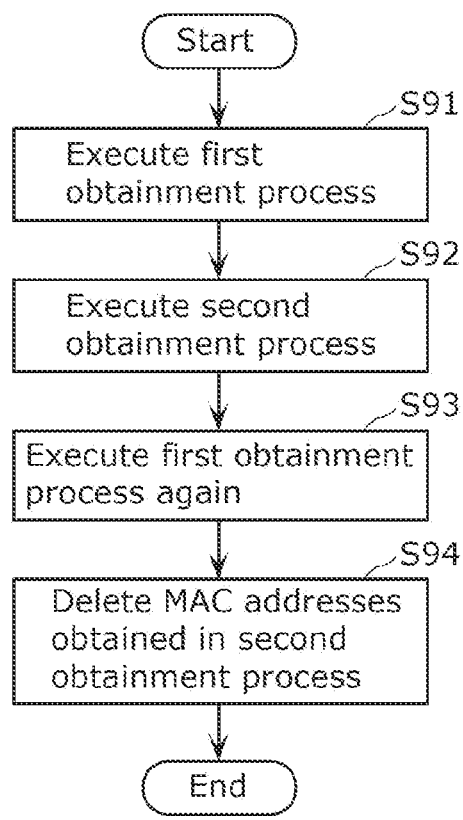
FIG. 23 is a flowchart of operation according to Variation 1.

In the case where, after the first obtainment process and the second obtainment process are executed in this order, the first obtainment process is executed again, the MAC addresses stored in storage 35 in the second obtainment process may be deleted, that is, the second obtainment process may be reset. FIG. 23 is a flowchart of operation according to Variation 1, Upon reception of an operation on first execution icon 32b, controller 34 executes the first obtainment process (S91). Upon reception of an operation on second execution icon 32c, controller 34 executes the second obtainment process (S92). After this, upon reception of an operation on first execution icon 32b again, controller 34 executes the first obtainment process (S93), and then deletes the MAC addresses obtained in the second obtainment process in Step S92 and stored in storage 35 (S94). That is, the MAC addresses obtained in the second obtainment process are reset.

Thus, in the case where the first obtainment process is executed again after the second obtainment process (including the process of storing the MAC addresses in storage 35), information terminal 30 deletes the MAC addresses stored in the second obtainment process. In this way, for example, when moving to another space and starting the first obtainment process, the result (MAC addresses) of the second obtainment process executed in the previous space is automatically deleted. Information terminal 30 can therefore aid in improving the work efficiency of the installation personnel.

In the case of performing the first obtainment process again, the plurality of icons 32a displayed immediately before this first obtainment process are updated.

[Variation 2]

Figure 24:
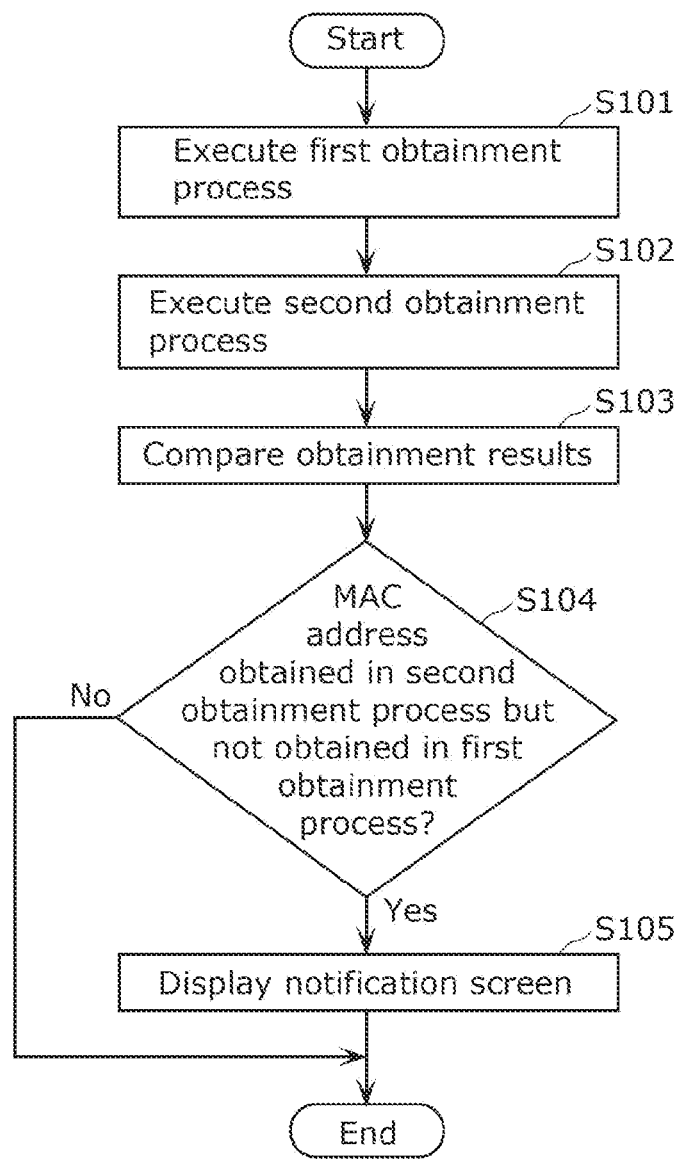
FIG. 24 is a flowchart of operation according to Variation 2.

The first obtainment process is intended for all lighting fixtures 10 and the second obtainment process is intended for part of lighting fixtures 10, as mentioned above. Hence, all MAC addresses obtained in the second obtainment process are supposed to be included in the MAC addresses obtained in the first obtainment process. However, this may not be the case when, for example, the communication condition is poor. Operation according to Variation 2 assuming such irregular cases will be described below. FIG. 24 is a flowchart of the operation according to Variation 2.

Upon reception of an operation on first execution icon 32b, controller 34 executes the first obtainment process (S101). Upon reception of an operation on second execution icon 32c, controller 34 executes the second obtainment process (S102). After this, controller 34 compares the MAC addresses obtained in the first obtainment process and the MAC addresses obtained in the second obtainment process (S103), to determine whether the MAC addresses obtained in the second obtainment process include any MAC address not obtained in the first obtainment process (S104).

Figure 25:
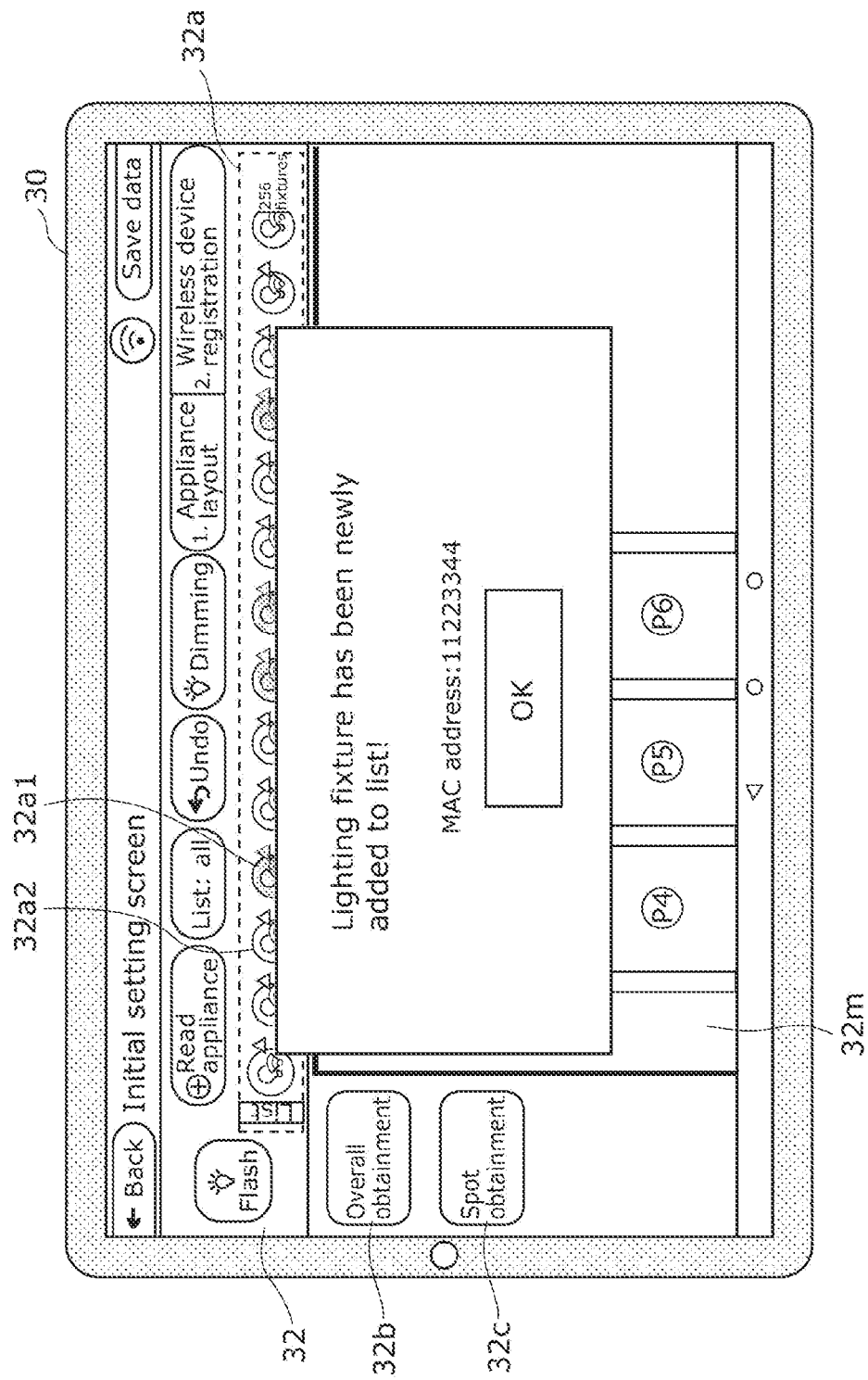
FIG. 25 is a diagram illustrating a first example of a notification screen for notifying that a new MAC address has been obtained.
Figure 26:
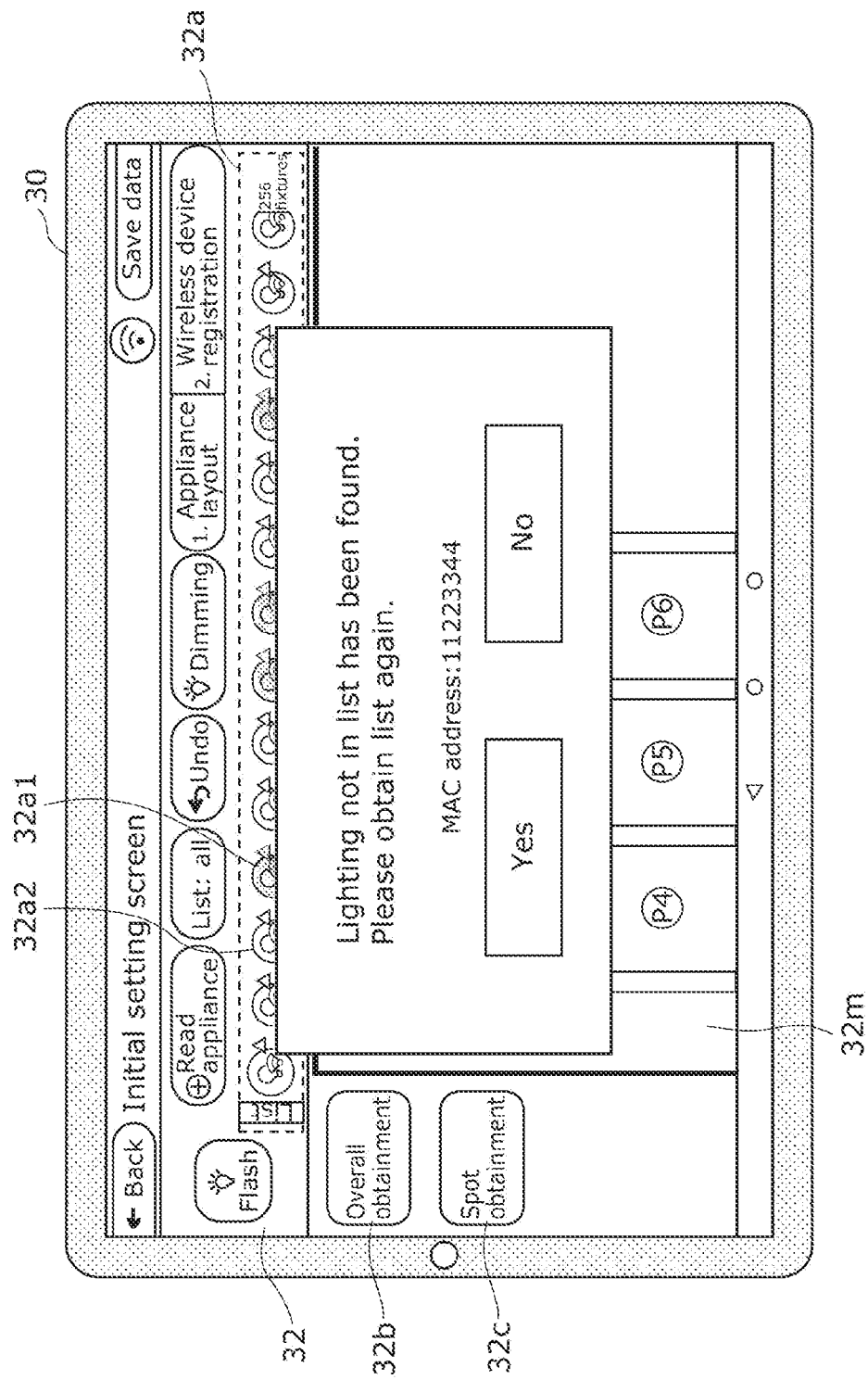
FIG. 26 is a diagram illustrating a second example of a notification screen for notifying that a new MAC address has been obtained.

In the case where controller 34 determines that the MAC addresses obtained in the second obtainment process include no MAC address not obtained in the first obtainment process (S104: No), the operation ends. In the case where controller 34 determines that the MAC addresses obtained in the second obtainment process include any MAC address not obtained in the first obtainment process (S104: Yes), controller 34 displays, on display 32, a notification screen for notifying the installation personnel that a new MAC address has been obtained (S105). For example, the notification screen is pop-up displayed (superimposed) on the initial setting screen. FIG. 25 is a diagram illustrating a first example of the notification screen for notifying that a new MAC address has been obtained. FIG. 26 is a diagram illustrating a second example of the notification screen.

In the example in FIG. 25, the new MAC address is registered as a MAC address obtained in the first obtainment process as a result of the installation personnel tapping "OK" icon included in the notification screen. In the example in FIG. 26, the first obtainment process is executed again as a result of the installation personnel tapping "yes" icon included in the notification screen.

Thus, in the case where the MAC addresses obtained in the second obtainment process include any MAC address not obtained in the first obtainment process, information terminal 30 displays the second notification screen for notifying this on display 32. This allows the installation personnel to easily recognize that a MAC address has been newly obtained.

Figure 27:
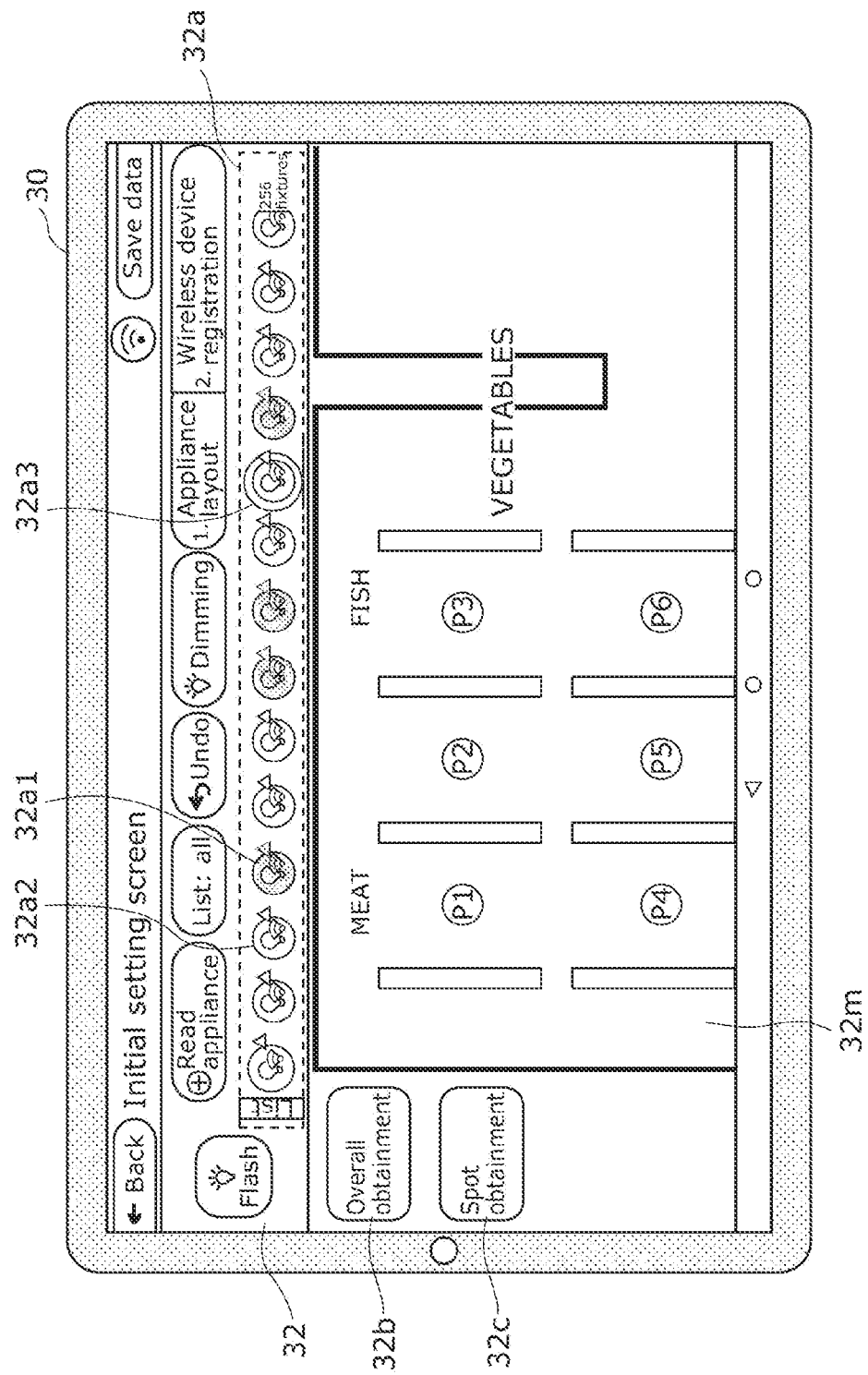
FIG. 27 is a diagram illustrating an example of display of an icon corresponding to a newly obtained MAC address.

In the display list of the plurality of icons 32a, an icon corresponding to the newly obtained MAC address may be displayed in a different mode from first icon 32a1 and second icon 32a2. FIG. 27 is a diagram illustrating an example of display of icon 32a3 corresponding to the newly obtained MAC address. This allows the installation personnel to easily recognize the icon corresponding to the newly obtained MAC address.

[Variation 3]

Figure 28:
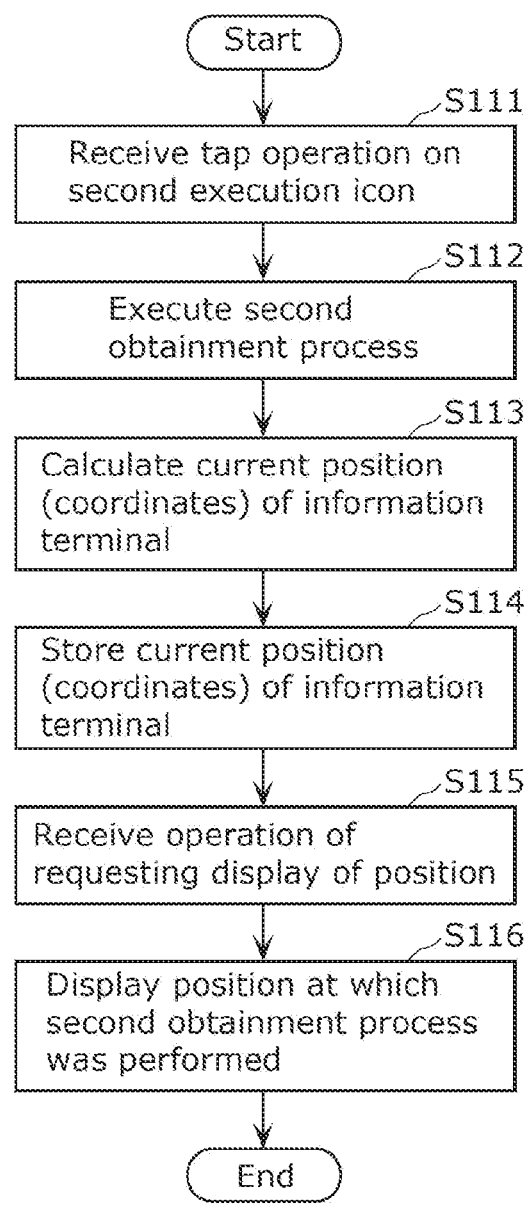
FIG. 28 is a flowchart of operation according to Variation 3.

When associating MAC addresses and installation positions with each other, the installation personnel repeatedly operates information terminal 30 and executes the second obtainment process while moving in the indoor space. Each place (position) in the indoor space where the installation personnel instructed information terminal 30 to execute the second obtainment process may be stored in storage 35 as history, and displayed when requested by the installation personnel. FIG. 28 is a flowchart of operation according to such Variation 3.

First, operation receiver 31 receives a tap operation on second execution icon 32c (S111). After operation receiver 31 receives the tap operation on second execution icon 32c, controller 34 executes the second obtainment process (S112).

Here, controller 34 calculates the current position of information terminal 30 (S113). For example, in the case where a plurality of wireless communication devices whose installation positions are known are installed in the indoor space, controller 34 can calculate (estimate) the current position of information terminal based on the reception signal intensity of a signal (radio wave) transmitted from each of the plurality of wireless communication devices. The signal (radio wave) transmitted from each of the plurality of wireless communication devices may be received by wireless communicator 33, or received by wireless communicator 41. Controller 34 may calculate the current position of information terminal 30 by calculating the displacement from the initial position using accelerometer 36.

Controller 34 stores the calculated current position of information terminal 30 in storage 35, as the position (position information) at which the second obtainment process was performed (S114). Subsequently, when operation receiver 31 receives an operation of requesting display of the position at which the second obtainment process was performed (S115), controller 34 superimposes, on map image

Figure 29:
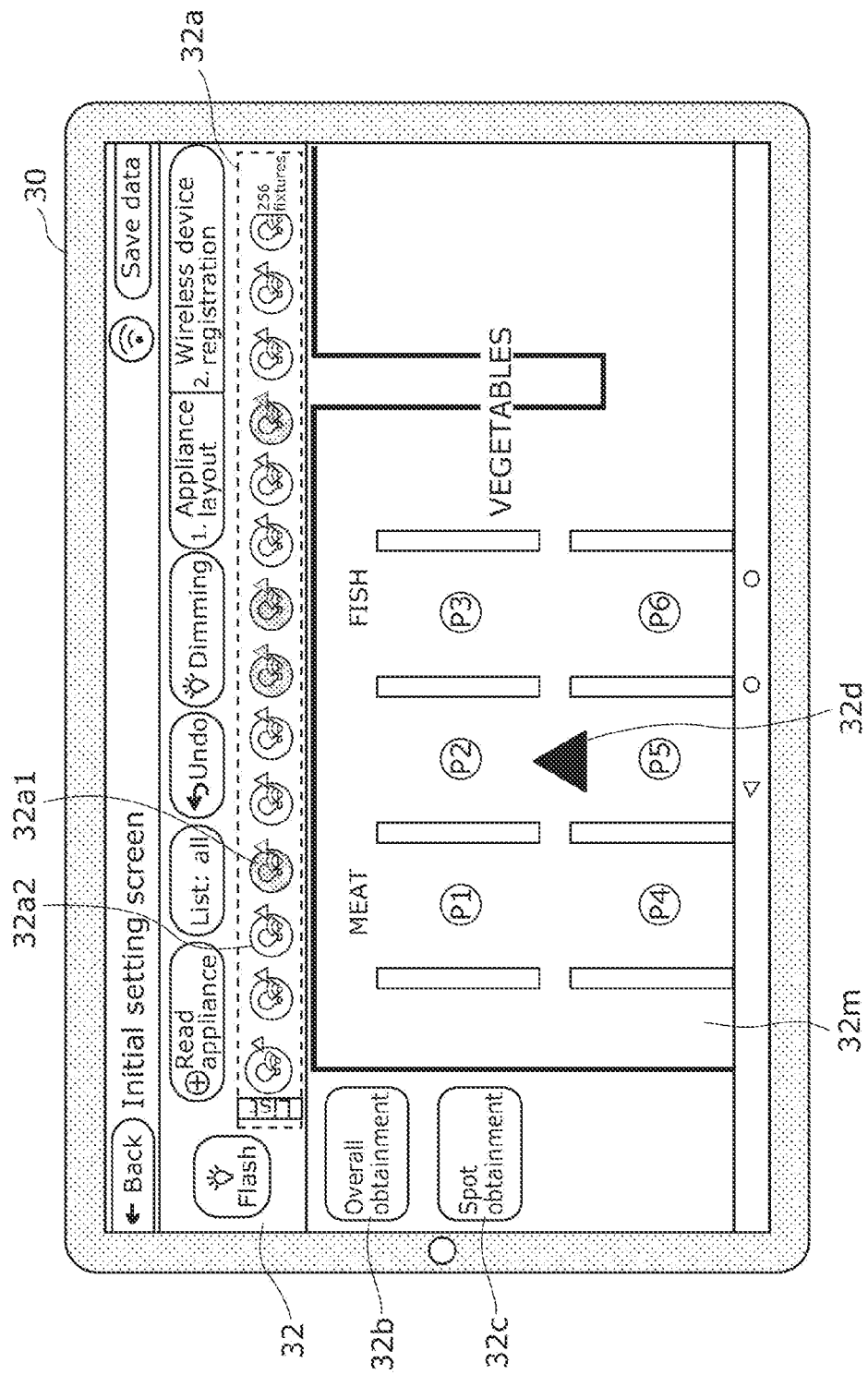
FIG. 29 is a diagram illustrating an example of display of a position at which the second obtainment process was performed.

32m, icon 32d indicating the position at which the second obtainment process was performed (S116). FIG. 29 is a diagram illustrating an example of display of a position at which the second obtainment process was performed.

Thus, information terminal 30 displays the position of information terminal 30 in the indoor space when the second obtainment process was executed, Information terminal 30 can therefore aid the installation personnel in recognizing the position at which the second obtainment process was executed.

[Effects, Etc.]

As described above, an information processing method executed by a computer such as information terminal 30 is an information processing method executed by information terminal 30, including: executing a first obtainment process of obtaining identification information of each of a plurality of lighting fixtures 10 installed in a space, in response to a first request transmitted to a first range in the space by radio wave communication (e.g. S16); and executing a second obtainment process of obtaining identification information of part of the plurality of lighting fixtures 10, in response to a second request transmitted to a second range in the space by radio wave communication, the second range being narrower than the first range (e.g. S33). Such information processing method is illustrated in, for example, FIG. 5. The identification information is, for example, a MAC address.

With such information processing method, identification information is obtained in each of the two radio wave communication operations that differ in radio wave coverage, so that the identification information of all lighting fixtures 10 in the space and the identification information of part of lighting fixtures 10 located near information terminal 30 can be displayed to the user in a state of being distinguishable from each other. Hence, the information processing method can present lighting fixtures 10 located near information terminal 30 to the user.

For example, the information processing method further includes: displaying, on display 32, a notification screen for notifying that the first obtainment process has not been executed, when an operation of instructing the information terminal to execute the second obtainment process is received from a user before the first obtainment process is executed (S44). Such information processing method is illustrated in, for example, FIG. 13. The user is, for example, installation personnel.

With such information processing method, the user can be guided so that the first obtainment process will be executed before the second obtainment process.

For example, when an operation of instructing information terminal 30 to execute the second obtainment process is received by operation receiver 31 before the first obtainment process is executed, the first obtainment process is executed and then the second obtainment process is executed. Such information processing method is illustrated in, for example, FIG. 16, With such information processing method, the user can be guided so that the first obtainment process will be executed before the second obtainment process.

For example, a prerequisite for executing the second obtainment process is that the first obtainment process has already been executed.

With such information processing method, the first obtainment process can be executed before the second obtainment process.

For example, the information processing method further includes: displaying first execution icon 32b to be operated by a user to instruct information terminal 30 to execute the first obtainment process, on display 32 (S71); and displaying, after the first obtainment process is executed, second execution icon 32c to be operated by the user to instruct information terminal 30 to execute the second obtainment process, on display 32 (S74). Such information processing method is illustrated in, for example, FIG. 19.

With such information processing method, the first obtainment process can be executed before the second obtainment process.

For example, the displaying of the second execution icon includes displaying second execution icon 32c on display 32 for a predetermined period after the first obtainment process is executed, and clearing display of second execution icon 32c after the predetermined period elapses (S84). Such information processing method is illustrated in, for example, FIG. 22.

With such information processing method, the first obtainment process can be performed, and the second obtainment process can be performed within the predetermined period.

For example, the information processing method further includes: displaying first execution icon 32b to be operated by a user to instruct information terminal 30 to execute the first obtainment process, on display 32; and displaying second execution icon 32c to be operated by the user to instruct information terminal 30 to execute the second obtainment process, on display 32 (S61), and an operation on second execution icon 32c is disabled until the first obtainment process is executed (S62). Such information processing method is illustrated in, for example, FIG. 17.

With such information processing method, the first obtainment process can be executed before the second obtainment process.

For example, the information processing method further includes: storing the identification information obtained in the second obtainment process, in storage 35 (S91); and deleting the identification information stored in the storing, when the first obtainment process is executed again after the storing (S94). Such information processing method is illustrated in, for example, FIG. 23.

With such information processing method, each time the first obtainment process is executed, the result (identification information) of the second obtainment process is automatically deleted. This can aid in improving the work efficiency of the user.

For example, the information processing method further includes: displaying, when the identification information obtained in the second obtainment process includes identification information not obtained in the first obtainment process, a second notification screen for notifying that the identification information obtained in the second obtainment process includes the identification information not obtained in the first obtainment process, on display 32 (S105). Such information processing method is illustrated in, for example, FIG. 24.

Such information processing method can aid the user in recognizing that new identification information has been obtained.

For example, the information processing method further includes: displaying first icon 32a1 and second icon 32a2 in different modes on display 32, first icon 32a1 being an icon for selecting identification information obtained only in the first obtainment process out of the first obtainment process and the second obtainment process, and second icon 32a2 being an icon for selecting identification information obtained in both the first obtainment process and the second obtainment process (S35), Such information processing method is illustrated in, for example, FIG. 5.

Such information processing method can aid the user in selecting the identification information of lighting fixture 10 that is located near information terminal 30 and can be visually recognized easily, For example, when the first obtainment process is executed again after the displaying, first icon 32a1 and second icon 32a2 being displayed are updated.

With such information processing method, each time the first obtainment process is executed, the plurality of icons 32a are updated. This can aid in improving the work efficiency of the user.

For example, in the displaying, a plurality of icons 32a including first icon 32a1 and second icon 32a2 are displayed, and the information processing method further includes: displaying map image 32m indicating installation positions of the plurality of lighting fixtures 10, on display 32 (S12); receiving a selection operation of selecting icon 32a out of the plurality of icons 32a and a selection operation of selecting an installation position out of the installation positions of the plurality of lighting fixtures 10 in map image 32m (S23); storing, based on the selection operations received, identification information indicated by icon 32a selected and the installation position selected in association with each other (S24); and clearing display of icon 32a for which association with the installation position has been completed out of the plurality of icons 32a (S25). Such information processing method is illustrated in, for example, FIG. 5.

With such information processing method, the user can preferentially perform association between lighting fixture 10 that is located near information terminal 30 and can be visually recognized easily and its installation position, That is, the information processing method can aid in improving the work efficiency of the user when associating icon 32a and the corresponding installation position.

For example, the information processing method further includes: displaying a position of information terminal 30 in the space at a time when the second obtainment process is executed S116). Such information processing method is illustrated in, for example, FIG. 28.

Such information processing method can aid the user in recognizing the position at which the second obtainment process was executed.

Other Embodiments

While an embodiment has been described above, the present invention is not limited to the foregoing embodiment.

For example, although a MAC address is used as an example of identification information in the foregoing embodiment, identification information is not limited to a MAC address as long as it can uniquely identify a lighting fixture.

The communication methods between the devices described in the foregoing embodiment are examples, and do not limit the present invention.

The processes performed by any specific processing unit in the foregoing embodiment may be performed by another processing unit. A plurality of processes may be changed in order, and a plurality of processes may be performed in parallel.

Each of the structural elements such as the controller in the foregoing embodiment may be implemented by executing a software program suitable for the structural element. Each of the structural elements may be implemented by means of a program executing unit, such as a CPU or a processor, reading and executing the software program recorded on a recording medium such as a hard disk or a semiconductor memory.

Each of the structural elements such as the controller may be implemented by hardware. For example, the structural elements such as the controller may be circuits (or integrated circuits). These circuits may constitute one circuit as a whole, or may be separate circuits. These circuits may each be a general-purpose circuit or a dedicated circuit.

The general and specific aspects of the present invention may be implemented using a system, a device, an integrated circuit, a computer program, or a computer-readable recording medium such as CD-ROM, or any combination of systems, devices, integrated circuits, computer programs, and recording media. For example, the present invention may be implemented as the lighting system or the information terminal in the foregoing embodiment, implemented as a program for causing an information terminal to execute the information processing method, or implemented as a non-transitory recording medium having the program recorded thereon. Such a program includes an application program for causing a general-purpose information terminal to operate as the information terminal in the foregoing embodiment.

Other modifications obtained by applying various changes conceivable by a person skilled in the art to each embodiment of the structural elements and functions in each embodiment without departing from the scope of the present invention are also included in the present invention.

REFERENCE SIGNS LIST 10 lighting fixture
30 information terminal
31 operation receiver
32 display
32a, 32a3 icon
32a1 first icon
32a2 second icon
32b first execution icon
32c second execution icon
32m map image

The invention claimed is:

1. An information processing method executed by an information terminal, the information processing method comprising:
  executing a first obtainment process of obtaining identification information of each of a plurality of lighting fixtures installed in a space, in response to a first request transmitted to a first range in the space by radio wave communication; and
  executing a second obtainment process of obtaining identification information of part of the plurality of lighting fixtures, in response to a second request transmitted to a second range in the space by radio wave communication, the second range being narrower than the first range,
  wherein the information terminal includes a display, and the information processing method further comprises:
  displaying, on the display, a notification screen for notifying that the first obtainment process has not been executed, when an operation of instructing the information terminal to execute the second obtainment process is received from a user before the first obtainment process is executed.

2. The information processing method according to claim 1,
wherein a prerequisite for executing the second obtainment process is that the first obtainment process has already been executed.

3. The information processing method according to claim 1, further comprising:
displaying a position of the information terminal in the space at a time when the second obtainment process is executed.

4. A non-transitory computer-readable recording medium for use in a computer, the recording medium having a program recorded thereon for causing the computer to execute the information processing method according to claim 1.

5. An information processing method executed by an information terminal, the information processing method comprising:
executing a first obtainment process of obtaining identification information of each of a plurality of lighting fixtures installed in a space, in response to a first request transmitted to a first range in the space by radio wave communication; and
executing a second obtainment process of obtaining identification information of part of the plurality of lighting fixtures, in response to a second request transmitted to a second range in the space by radio wave communication, the second range being narrower than the first range,
wherein the information terminal includes an operation receiver that receives an operation of a user, and
when an operation of instructing the information terminal to execute the second obtainment process is received by the operation receiver before the first obtainment process is executed, the first obtainment process is executed and then the second obtainment process is executed.

6. A non-transitory computer-readable recording medium for use in a computer, the recording medium having a program recorded thereon for causing the computer to execute the information processing method according to claim 5.

7. An information processing method executed by an information terminal, the information processing method comprising:
executing a first obtainment process of obtaining identification information of each of a plurality of lighting fixtures installed in a space, in response to a first request transmitted to a first range in the space by radio wave communication; and
executing a second obtainment process of obtaining identification information of part of the plurality of lighting fixtures, in response to a second request transmitted to a second range in the space by radio wave communication, the second range being narrower than the first range,
wherein a prerequisite for executing the second obtainment process is that the first obtainment process has already been executed,
the information terminal includes a display, and
the information processing method further comprises:
displaying a first execution icon to be operated by a user to instruct the information terminal to execute the first obtainment process, on the display; and
displaying, after the first obtainment process is executed, a second execution icon to be operated by the user to instruct the information terminal to execute the second obtainment process, on the display.

8. The information processing method according to claim 7,
wherein the displaying of the second execution icon includes displaying the second execution icon on the display for a predetermined period after the first obtainment process is executed, and clearing display of the second execution icon after the predetermined period elapses.

9. A non-transitory computer-readable recording medium for use in a computer, the recording medium having a program recorded thereon for causing the computer to execute the information processing method according to claim 7.

10. An information processing method executed by an information terminal, the information processing method comprising:
executing a first obtainment process of obtaining identification information of each of a plurality of lighting fixtures installed in a space, in response to a first request transmitted to a first range in the space by radio wave communication; and
executing a second obtainment process of obtaining identification information of part of the plurality of lighting fixtures, in response to a second request transmitted to a second range in the space by radio wave communication, the second range being narrower than the first range,
wherein a prerequisite for executing the second obtainment process is that the first obtainment process has already been executed,
the information terminal includes a display,
the information processing method further comprises:
displaying a first execution icon to be operated by a user to instruct the information terminal to execute the first obtainment process, on the display; and
displaying a second execution icon to be operated by the user to instruct the information terminal to execute the second obtainment process, on the display, and
an operation on the second execution icon is disabled until the first obtainment process is executed.

11. A non-transitory computer-readable recording medium for use in a computer, the recording medium having a program recorded thereon for causing the computer to execute the information processing method according to claim 10.

12. An information processing method executed by an information terminal, the information processing method comprising:
executing a first obtainment process of obtaining identification information of each of a plurality of lighting fixtures installed in a space, in response to a first request transmitted to a first range in the space by radio wave communication; and
executing a second obtainment process of obtaining identification information of part of the plurality of lighting fixtures, in response to a second request transmitted to a second range in the space by radio wave communication, the second range being narrower than the first range,
wherein the information terminal includes a storage, and
the information processing method further comprises:
storing the identification information obtained in the second obtainment process, in the storage; and deleting the identification information stored in the storing, when the first obtainment process is executed again after the storing.

13. A non-transitory computer-readable recording medium for use in a computer, the recording medium having a program recorded thereon for causing the computer to execute the information processing method according to claim 12.

14. An information processing method executed by an information terminal, the information processing method comprising:
executing a first obtainment process of obtaining identification information of each of a plurality of lighting fixtures installed in a space, in response to a first request transmitted to a first range in the space by radio wave communication; and
executing a second obtainment process of obtaining identification information of part of the plurality of lighting fixtures, in response to a second request transmitted to a second range in the space by radio wave communication, the second range being narrower than the first range,
wherein the information terminal includes a display, and the information processing method further comprises:
displaying, when the identification information obtained in the second obtainment process includes identification information not obtained in the first obtainment process, a second notification screen for notifying that the identification information obtained in the second obtainment process includes the identification information not obtained in the first obtainment process, on the display.

15. A non-transitory computer-readable recording medium for use in a computer, the recording medium having a program recorded thereon for causing the computer to execute the information processing method according to claim 14.

16. An information processing method executed by an information terminal, the information processing method comprising:
executing a first obtainment process of obtaining identification information of each of a plurality of lighting fixtures installed in a space, in response to a first request transmitted to a first range in the space by radio wave communication; and
executing a second obtainment process of obtaining identification information of part of the plurality of lighting fixtures, in response to a second request transmitted to a second range in the space by radio wave communication, the second range being narrower than the first range,
wherein the information terminal includes a display, and the information processing method further comprises:
displaying a first icon and a second icon in different modes on the display, the first icon being an icon for selecting identification information obtained only in the first obtainment process out of the first obtainment process and the second obtainment process, and the second icon being an icon for selecting identification information obtained in both the first obtainment process and the second obtainment process.

17. The information processing method according to claim 16,
wherein when the first obtainment process is executed again after the displaying, the first icon and the second icon being displayed are updated.

18. The information processing method according to claim 16,
wherein in the displaying, a plurality of icons including the first icon and the second icon are displayed, and the information processing method further comprises:
displaying a map image indicating installation positions of the plurality of lighting fixtures, on the display;
receiving a selection operation of selecting an icon out of the plurality of icons and a selection operation of selecting an installation position out of the installation positions of the plurality of lighting fixtures in the map image;
storing, based on the selection operations received, identification information indicated by the icon selected and the installation position selected in association with each other; and
clearing display of the icon for which association with the installation position has been completed out of the plurality of icons.

19. A non-transitory computer-readable recording medium for use in a computer, the recording medium having a program recorded thereon for causing the computer to execute the information processing method according to claim 16.

* * * * *